US012496576B2

(12) United States Patent
Arrigo et al.

(10) Patent No.: US 12,496,576 B2
(45) Date of Patent: Dec. 16, 2025

(54) APPARATUS AND METHOD FOR COLLECTING LIQUID SAMPLES

(71) Applicant: Western Connecticut Health Network, Inc., Danbury, CT (US)

(72) Inventors: Lisa M. Arrigo, Danbury, CT (US); Jennifer N. Campbell, Ridgefield, CT (US); Paul N. Fiedler, New Haven, CT (US); Denise Hammond-McKibben, Green Oaks, IL (US)

(73) Assignee: NUVANCE HEALTH, Danbury, CT (US)

( * ) Notice: Subject to any disclaimer, the term of this patent is extended or adjusted under 35 U.S.C. 154(b) by 605 days.

(21) Appl. No.: 17/795,866

(22) PCT Filed: Jan. 29, 2021

(86) PCT No.: PCT/US2021/015809
§ 371 (c)(1),
(2) Date: Jul. 27, 2022

(87) PCT Pub. No.: WO2021/155221
PCT Pub. Date: Aug. 5, 2021

(65) Prior Publication Data

US 2023/0098565 A1 Mar. 30, 2023

Related U.S. Application Data

(60) Provisional application No. 62/968,686, filed on Jan. 31, 2020.

(51) Int. Cl.
*B01L 3/00* (2006.01)
*B01L 3/02* (2006.01)

(52) U.S. Cl.
CPC ............ *B01L 3/022* (2013.01); *B01L 3/5029* (2013.01); *B01L 2200/025* (2013.01);
(Continued)

(58) Field of Classification Search
CPC .. B01L 3/022; B01L 3/5029; B01L 2200/025; B01L 2300/0838; B01L 2300/12; B01L 2400/0409; B01L 2400/049
See application file for complete search history.

(56) References Cited

U.S. PATENT DOCUMENTS

| | | | |
|---|---|---|---|
| 3,792,699 | A | 2/1974 | Tobin et al. |
| 4,557,975 | A | 12/1985 | Moore |

(Continued)

FOREIGN PATENT DOCUMENTS

| | | | |
|---|---|---|---|
| EP | 2741675 | A1 | 6/2014 |
| WO | 2001/021310 | A2 | 3/2001 |

(Continued)

OTHER PUBLICATIONS

International Search Report and Written Opinion dated Jul. 30, 2021 in connection with PCT International Application No. PCT/US2021/155221.

*Primary Examiner* — Jill A Warden
*Assistant Examiner* — Michael Stanley Gzybowski
(74) *Attorney, Agent, or Firm* — Wiggin and Dana LLP

(57) ABSTRACT

The present invention relates to devices and methods for collecting liquid samples such as for removing a target liquid sample fraction from a larger liquid sample, e.g., from a biological sample. These devices and methods are particularly useful for rapidly and cost-effectively removing the buffy coat layer from an anticoagulated blood sample. These devices and methods have the advantage that the removal can be made on blood sample processed by ordinary centrifugation and do not require more complicated or costly processing techniques such as density gradient centrifugation.

22 Claims, 23 Drawing Sheets

(52) U.S. Cl.
CPC ... *B01L 2300/0838* (2013.01); *B01L 2300/12* (2013.01); *B01L 2400/0409* (2013.01); *B01L 2400/049* (2013.01)

(56) References Cited

U.S. PATENT DOCUMENTS

| | | | | |
|---|---|---|---|---|
| 8,114,027 | B2 | 2/2012 | Triva | |
| 8,317,728 | B2 | 11/2012 | Triva | |
| 8,334,134 | B2 | 12/2012 | Young et al. | |
| 8,420,385 | B2 | 4/2013 | Young et al. | |
| 8,989,784 | B2 | 3/2015 | Triva | |
| 9,011,358 | B2 | 4/2015 | Triva | |
| 9,170,177 | B2 | 10/2015 | Triva | |
| 9,428,788 | B2 | 8/2016 | Triva | |
| D772,398 | S | 11/2016 | Triva | |
| 9,504,452 | B2 | 11/2016 | Triva | |
| 10,092,275 | B2 | 10/2018 | Triva | |
| 10,388,501 | B1 * | 8/2019 | Liu | H01J 49/062 |
| 2002/0110900 | A1 | 8/2002 | Jovanovich et al. | |
| 2011/0008771 | A1 | 1/2011 | Hanselle et al. | |
| 2011/0092686 | A1 * | 4/2011 | Motadel | B01L 3/0275<br>422/547 |
| 2016/0045188 | A1 | 2/2016 | Triva | |
| 2018/0243736 | A1 | 8/2018 | Li et al. | |

FOREIGN PATENT DOCUMENTS

| | | | |
|---|---|---|---|
| WO | 2004/086979 | A1 | 10/2004 |
| WO | 2008/036091 | A1 | 3/2008 |

* cited by examiner

APPARATUS AND METHOD FOR COLLECTING LIQUID SAMPLES

CROSS-REFERENCE TO RELATED APPLICATIONS

This application is a national phase entry under 35 U.S.C. § 371 of International Application PCT/US2021/015809, filed Jan. 29, 2021, which claims priority under 35 U.S.C § 119(e) to U.S. Provisional Application No. 62/968,686, filed Jan. 31, 2020, each of which are incorporated by reference in their entirety herein.

FIELD OF THE INVENTION

The present invention relates to devices and methods for collecting liquid samples. These devices and methods are useful for removing a target liquid sample fraction from a larger liquid sample, such as from a biological sample. These devices and methods are particularly useful for rapidly and cost-effectively removing the buffy coat layer from an anticoagulated blood sample, and have the advantage of directly removing this layer from an anticoagulated blood sample that has been processed by ordinary centrifugation, rather than requiring that the sample be processed by the more complicated and costly technique of density-gradient centrifugation.

BACKGROUND OF THE INVENTION

In analytical and clinical laboratories, such as hematology laboratories, it is often necessary to centrifuge and separate samples into discrete sample layers or components for further analyses. For example, anticoagulated blood samples are commonly fractionated by centrifugation resulting in three distinct layers, each comprising a suspension of materials. These layers are (i) a lower fluid layer containing most of the red blood cells, i.e. the erythrocytes; (ii) a thin middle buff-colored layer, which is referred to as the "buffy coat", containing the white blood cells, i.e. the leukocytes and platelets; and (iii) a clear fluid top layer, i.e. the plasma layer. Typically, the buffy coat layer makes up less than about 1 percent by volume of the blood sample, whereas the top plasma layer makes up about 55 percent by volume and the red blood cell layer about 45 percent by volume.

Depending on the desired components to be analyzed, it is highly desirable to separate one or more of these layers from the others. For example, one can analyze a blood sample not only for the presence of normal blood components, but also for the presence of materials that might not normally be present, such as bacteria, fungi, fetal cells, parasites, virus infected cells, circulating tumor cells, and endothelial cells. Furthermore, the buffy coat layer is typically used to extract DNA from the blood of mammals for various types of genetic testing, and also for identifying and quantitating pathogenic microorganisms. In other assays, the buffy coat is used for the quantitative buffy coat (QBC) laboratory test for detecting blood parasites such as malaria. Due to the relatively small volume of the buffy coat layer, it is not always easy to form it from a whole blood sample and to subsequently quantitatively remove it from the other layers.

Even though the buffy coat is critical for many hematological analyses, it is not easily isolated from fractioned blood samples by current methods. These current methods fall into three general categories, each with their advantages and disadvantages: (i) density gradient centrifugation using Ficoll-Paque, (ii) density gradient centrifugation using the RareCyte-AccuCyte system, and (iii) immunoselection with magnetic particles.

Ficoll-Paque is used to separate blood into its components and utilizes Ficoll-Paque (available from GE Healthcare), which is a neutral, highly branched, high-mass, hydrophilic polysaccharide having particles with radii ranging from 2-7 nm. The methodology requires that a whole blood sample is layered atop a solution of proper density and osmotic strength (in this case the Ficoll-Paque) in a conical tube. This layering is followed by centrifugation, which results in isolation of peripheral blood mononuclear cells (PBMC's). The centrifugation step provides the following layers (from bottom to top), which are usually visible in the conical tube: a layer of Ficoll-Paque, and erythrocytes and granulocytes which should be present in pellet form (the bottom layer), a layer of mononuclear cells called the buffy coat (PBMC/MNC) (the middle layer), and a plasma layer and other constituents (the top layer). Although the technique is relatively cost-effective, i.e. as low as about $5 per sample, cell recovery can be suboptimal and the layering of the whole blood sample atop the Ficoll-Paque for sample preparation can be difficult to perform, thus compromising the reliability and effectiveness of this separation and isolation technique.

The RareCyte-Accucyte sample preparation system utilizes a kit containing density gradient solutions, specialized tubes with floats for helping to isolate and separate the fractions during centrifugation, and a tube sealing device. Even though good separation can be achieved, the system and method requires more costly and specialized equipment, which currently averages about $220 per sample. This per sample cost excludes the upfront cost for the sealer instrument, which is currently about $10,000.

Furthermore, these two foregoing methods utilize density gradient centrifugation, a technique which is cumbersome, time-consuming, and costly to perform. However, ordinary centrifugation methods, i.e. without the use of a density gradient, cannot be used with ordinary pipetting devices for removal of the buffy coat.

The third method currently in use for the removal of the buffy coat involves the combination of immunoselection and magnetic particles. With this methodology, the cells of interest in the blood sample are targeted by antibodies, which have been covalently linked to magnetic beads. The cells that have been labeled with the magnetic antibodies are either collected using a specialized magnetic device as cells of interest (positive selection) or removed from the remainder of the sample as unwanted cells (negative selection). Even though the method is relatively rapid and has the potential for good cell recovery, it is relatively expensive to perform, costing about $66 per sample. The method also has the disadvantage of relying on a specific antigen detection methodology. Furthermore, the upfront cost of the specialized magnetic device is about $2000.

It is therefore seen from the foregoing that it would be highly desirable to provide devices, systems, and methods for efficiently and cost-effectively isolating specific components or layers from blood samples, such as the buffy coat. It would also be highly desirable to provide devices and methods that can be used on anti-coagulated blood samples that have been processed by ordinary centrifugation without requiring density gradient centrifugation or other highly specialized techniques. The present invention meets these needs by providing devices that can be used alone, or in combination to both quickly and effectively isolate targeted layers, such as the buffy coat, from an anticoagulated blood sample without the need for density gradient centrifugation or other more complicated or costly techniques.

SUMMARY OF THE INVENTION

The present invention relates to a fluid collection device useful, for example, for removal of a target sample, i.e. a portion, of a larger liquid sample. The sample can be a biological sample such as a buffy coat layer of an anticoagulated blood sample. Examples of the device include embodiments such as Device 1 (which for convenience can be referred to as comprising an array of a plurality of capillary tubes), Device 2 (which for convenience can be referred to as comprising an array of a plurality of flocked swabs), and Device 3 (which for convenience can be described as a comprising a cylindrical solid manufacture with multiple cylindrical bores), all of these devices which are described herein in more detail.

In further embodiments the present invention relates to a fluid sample collection device [Device 1], comprising: (i) a plurality of capillary tubes, each tube comprising, a first end comprising an aperture, and a second end comprising an aperture, wherein the plurality of tubes comprise a parallel array such that the first end and second end of the tubes are directionally aligned with each other, and wherein each tube is in contact with at least one other tube, and (ii) a means for applying aspiration or a vacuum to the first end of the tubes.

In further embodiments, the present invention relates to a device [Device 1] wherein the array of tubes is based on a hexagonal, partial hexagonal, approximately hexagonal, or triangular (trigonal) packing pattern.

In further embodiments, the present invention relates to a device [Device 1] wherein the array of tubes comprises from about 3 to about 25 capillary tubes.

In further embodiments, the present invention relates to a device [Device 1] wherein the array of tubes comprises from about 7 to about 19 capillary tubes.

In further embodiments, the present invention relates to a device [Device 1] wherein the array of tubes comprise 12 capillary tubes.

In further embodiments, the present invention relates to a device [Device 1] wherein each tube has an inner diameter from about 0.1 mm to about 5 mm.

In further embodiments, the present invention relates to a device [Device 1] wherein each tube has an inner diameter from about 0.5 mm to about 2.5 mm.

In further embodiments, the present invention relates to a device [Device 1] wherein each tube has an inner diameter from about 0.9 mm to about 1.1 mm.

In further embodiments, the present invention relates to a device [Device 1] wherein each tube has a length from about 5 cm to about 15 cm.

In further embodiments, the present invention relates to a device [Device 1] wherein the means for applying aspiration or a vacuum is an automatic pipetting device.

In further embodiments, the present invention relates to a device [Device 1] wherein said fluid is a biological fluid.

In further embodiments, the present invention relates to a method of collecting a fluid sample comprising contacting the second end of the tubes of the device [Device 1] with the sample and applying aspiration or vacuum to the first end of the tubes to draw the sample into the tubes.

In further embodiments, the present invention relates to a method wherein said sample is an anticoagulated blood sample.

In further embodiments, the present invention relates to a method wherein said sample is the buffy coat layer of an anticoagulated blood sample that has been subject to centrifugation.

In further embodiments, the present invention relates to a method comprising the further step of releasing the sample from the tubes of the device [Device 1].

In further embodiments, the present invention relates to a method wherein the method of using the device [Device 1] is repeated two or more times.

In further embodiments, the present invention relates to a fluid sample collection device [Device 2], comprising: a plurality of flocked swabs, each swab comprising, a rod (or shaft) terminating in a tip covered with fiber with hydrophilic properties to allow absorption of said sample, characterized in that said fiber covers said tip in the form of a layer deposited by flocking; wherein the plurality of swabs comprise a parallel array such that the tips of the swabs are directionally aligned with each other, and wherein each tip is in contact with least one other tip.

In further embodiments, the present invention relates to a device [Device 2], comprising: a plurality of flocked swabs, each swab comprising, a rod (or shaft) terminating in a tip; and a layer of fibers which were disposed on a surface of the tip by flocking in an oriented manner in an electrostatic field, the layer of fibers having a thickness of 0.6 to 3 mm and being configured to have capillarity hydrophilic properties and configured to be capable of absorbing at least a quantity of about 40 μl of sample in the layer of fibers on the tip of the rod; wherein the plurality of swabs comprise a parallel array such that the tips of the swabs are directionally aligned with each other, and wherein each tip is in contact with least one other tip.

In further embodiments, the present invention relates to a device [Device 2], comprising: a plurality of flocked swabs, each swab comprising, a rod (or shaft) terminating in a tip; and a layer of fibers which were disposed on a surface of the tip by flocking in an oriented manner in an electrostatic field, the fibers having a length of 0.6 to 3 mm and the layer of fibers being configured to have capillarity hydrophilic properties and configured to be capable of absorbing at least a quantity of about 40 μl of sample in the layer of fibers on the tip of the rod; wherein the plurality of swabs comprise a parallel array such that the tips of the swabs are directionally aligned with each other, and wherein each tip is in contact with least one other tip.

In further embodiments, the present invention relates to a device [Device 2], comprising: a plurality of flocked swabs, each swab comprising, (i) a support body having at least a first portion, and a plurality of fibers attached and arranged on the first portion of the support body by flocking, such as to define a flocked collecting portion destined to collect, on the collecting portion, a quantity of sample, (ii) and optionally, a surfactant; wherein the plurality of swabs comprise a parallel array such that the tips of the swabs are directionally aligned with each other, and wherein each tip is in contact with least one other tip.

In further embodiments, the present invention relates to a device [Device 2], comprising: a plurality of flocked swabs, each swab comprising, (i) a rod (or shaft) terminating in a tip, (ii) a layer of fibers disposed on a surface of said tip by flocking with a flocking technique in which the fibers were deposited, in an electrostatic field, in an ordered manner perpendicularly to the surface of the tip of the rod, said layer of fibers having a thickness of 0.6 to 3 mm and being configured to be capable of absorbing a quantity of at least about 40 μL of liquid specimen on said tip of the rod by capillarity, wherein the plurality of swabs comprise a parallel array such that the tips of the swabs are directionally aligned with each other, and wherein each tip is in contact with least one other tip.

In further embodiments, the present invention relates to a device [Device 2], comprising: a plurality of flocked swabs, each swab comprising, (i) a rod (or shaft) terminating in a tip and a layer of fibers disposed on a surface of said tip by flocking with a flocking technique in which the fibers were deposited, in an electrostatic field, in an ordered manner perpendicularly to the surface of the tip of the swab rod, the layer of fibers having a thickness of 0.6 to 3 mm and a fiber count of 1.7 to 3.3 Dtex, said layer of fibers being configured to absorb a quantity of liquid specimens in said layer of fibers by capillarity and an amount of fiber deposited forming the flocked layer being configured to enable 40 μL of wherein the plurality of tubes comprise a parallel array such that the tips of the swabs are directionally aligned with each other, and wherein each tip is in contact with least one other tip.

In further embodiments, the present invention relates to a device capable of absorbing at least a quantity of about 100 μL sample.

In further embodiments, the present invention relates to a device [Device 2], comprising: a plurality of flocked swabs, each swab comprising, a flock fiber tipped applicator wherein the flocked fibers are sea-island biocomponent composite fibers, and the sea component of the composite fibers is not removed from the island component of the composite fibers, said fibers being adhered to the applicator with an adhesive, said biocomponent fibers comprising a first polyester sea material and a second polyester island material wherein the first polyester and the second polyester materials have a least one different property selected from the group consisting of melting point or solubility, aid bicomponent fibers being structurally stable in water, wherein the plurality of swabs comprise a parallel array such that the tips of the swabs are directionally aligned with each other, and wherein each tip is in contact with least one other tip.

In further embodiments, the present invention relates to a device [Device 2], capable of absorbing at least a quantity of about 100 μL sample.

In further embodiments, the present invention relates to a device [Device 2], comprising:

- a plurality of flocked swabs, wherein each swab is configured to collect and release a biological sample comprising a liquid, each swab comprising a flock fiber tipped applicator, wherein the flocked fibers are sea-island bicomponent composite fibers, wherein at least about 85% of the fibers comprise randomly splayed terminal ends of the islands of said bicomponent fibers along a length of about 50% or less from said ends, said fibers being adhered to the applicator with an adhesive, said bicomponent fibers comprising a first polyester sea material and a second polyester island material wherein the first polyester and the second polyester materials have at least one different property selected from the group consisting of melting point or solubility;

wherein the plurality of swabs comprise a parallel array such that the tips of the swabs are directionally aligned with each other, and wherein each tip is in contact with least one other tip.

In further embodiments, the present invention relates to a device [Device 2], wherein said first polyester has a lower melting point than said second polyester.

In further embodiments, the present invention relates to a device [Device 2], wherein said first polyester has a greater solubility in alkaline solution than said second polyester.

In further embodiments, the present invention relates to a device [Device 2], wherein the array of swabs is based on a hexagonal, partial hexagonal, approximately hexagonal, or triangular (trigonal) packing pattern.

In further embodiments, the present invention relates to a device [Device 2], wherein the array of swabs comprises from about 3 to about 7 swabs.

In further embodiments, the present invention relates to a device [Device 2], wherein the array of swabs comprises 3 swabs based on a triangular packing pattern.

In further embodiments, the present invention relates to a device [Device 2], wherein the array is based on a triangular packing pattern.

In further embodiments, the present invention relates to a device [Device 2], wherein said fluid is a biological fluid.

In further embodiments, the present invention relates to a device [Device 2] further comprising a conical sheath having a first circular top opening and a second circular bottom opening, with said first opening having a diameter smaller than the diameter of the second circular opening, wherein a portion of the plurality of swabs is enclosed within said sheath; wherein the tips of the swabs are contained within the second circular opening; and wherein the ends of the swabs opposite the tip extend through and beyond the first circular opening.

In further embodiments, the present invention relates to a method of collecting a fluid sample comprising contacting the swabs of device [Device 2] with the sample to draw the sample into the swabs.

In further embodiments, the present invention relates to a method wherein said sample is an anticoagulated blood sample.

In further embodiments, the present invention relates to a method wherein said sample is the buffy coat layer of an anticoagulated blood sample that has been subject to centrifugation.

In further embodiments, the present invention relates to a method comprising the further step of releasing the sample from the swabs.

In further embodiments, the present invention relates to a method wherein the method of using the device [Device 2] is repeated two or more times.

In further embodiments, the present invention relates to a method of collecting a fluid sample using Device 2 comprising the steps: i.) contacting the sheath with the opening of a sample container having the fluid sample contained within it, ii.) extending the swabs through the sheath and into the fluid sample at a desired depth to draw the fluid sample into the swabs, iii.) retracting the swabs to be contained within the sheath, and iv.) removing the device from the sample container.

In further embodiments, the present invention relates to a method of collecting a fluid sample using Device 2 wherein the fluid sample is a centrifuged anticoagulated blood sample.

In further embodiments, the present invention relates to a method of collecting a fluid sample using Device 2 further comprising twisting the plurality of swabs to draw the fluid sample into the swabs.

In further embodiments, the present invention relates to a fluid sample collection device [Device 3], comprising: i.) a cylindrical solid comprising a first end and a second end, wherein the cylindrical solid comprises a plurality of bores parallel to the axis of the cylindrical solid and running the entire length of the cylindrical solid, and ii.) a means for applying aspiration or a vacuum to the first end of the cylindrical solid.

In further embodiments, the present invention relates to a fluid sample collection device [Device 3], wherein each bore of the plurality of bores is circular (defines a circular cross-section).

In further embodiments, the present invention relates to a fluid sample collection device [Device 3], wherein the plurality of bores is based on a hexagonal, partial hexagonal, approximately hexagonal, heptagonal, or triangular (trigonal) packing pattern.

In further embodiments, the present invention relates to a fluid sample collection device [Device 3], wherein the array comprises from about 3 to about 25 bores.

In further embodiments, the present invention relates to a fluid sample collection device [Device 3], wherein the array comprises from about 6 to about 19 bores.

In further embodiments, the present invention relates to a fluid sample collection device [Device 3], wherein the array comprises 7 bores defining a symmetrical hexagonal array with a central bore surrounded by 6 bores symmetrically disposed around the central bore.

In further embodiments, the present invention relates to a fluid sample collection device [Device 3], wherein the array comprises 8 bores defining a symmetrical heptagonal array with a central bore surrounded by 7 bores symmetrically disposed around the central bore.

In further embodiments, the present invention relates to a fluid sample collection device [Device 3], wherein the cylindrical solid has a diameter of about 5 mm to about 20 mm.

In further embodiments, the present invention relates to a fluid sample collection device [Device 3], wherein each bore has an inner diameter from about 0.1 mm to about 5 mm.

In further embodiments, the present invention relates to a fluid sample collection device [Device 3], wherein each bore has an inner diameter from about 0.5 mm to about 2.5 mm.

In further embodiments, the present invention relates to a fluid sample collection device [Device 3], wherein each bore has an inner diameter of about 2 mm.

In further embodiments, the present invention relates to a fluid sample collection device [Device 3], wherein the cylindrical solid has a length from about 40 mm (4 cm) to about 150 mm (15 cm).

In further embodiments, the present invention relates to a fluid sample collection device [Device 3], wherein the means for applying aspiration or a vacuum is an automatic pipetting device.

In further embodiments, the present invention relates to a fluid sample collection device [Device 3], wherein said fluid is a biological fluid.

In further embodiments, the present invention relates to a method of collecting a fluid sample comprising contacting the second end of the cylindrical solid of Device 3 with the sample and applying aspiration or vacuum to the first end to draw the sample into the bores of the cylindrical solid.

In further embodiments, the present invention relates to a method of collecting a fluid sample wherein said sample is an anticoagulated blood sample.

In further embodiments, the present invention relates to a method of collecting a fluid sample wherein said sample is the buffy coat layer of an anticoagulated blood sample that has been subject to centrifugation.

In further embodiments, the present invention relates to a method of collecting a fluid sample comprising the further step of releasing the sample from the bores.

In further embodiments, the present invention relates to a method of collecting a fluid sample using Device 3 wherein the method is repeated two or more times.

In further embodiments, the present invention relates to a method of collecting a fluid sample comprising sequentially i.) contacting the swabs of Device 2 with the sample to draw the sample into the swabs, and ii.) contacting the second end of the tubes of Device 1 with the sample and applying aspiration or vacuum to draw the sample into the tubes.

In further embodiments, the present invention relates to a method of collecting a fluid sample comprising sequentially i.) contacting the second end of the tubes of Device 1 with the sample and applying aspiration or vacuum to draw the sample into the tubes, and ii.) contacting the swabs of Device 2 with the sample to draw the sample into the swabs.

In further embodiments, the present invention relates to a method of collecting a fluid sample comprising sequentially i.) contacting the second end of the cylindrical solid of Device 3 with the sample and applying aspiration or vacuum to draw the sample into the bores, and ii.) contacting the swabs of Device 2 with the sample to draw the sample into the swabs.

In further embodiments, the present invention relates to a method of collecting a fluid sample comprising sequentially i.) contacting the swabs of Device 2 with the sample to draw the sample into the swabs, and ii.) contacting the second end of the cylindrical solid of Device 3 with the sample and applying aspiration or vacuum to draw the sample into the bores.

These and other embodiments of the present invention will become apparent from the disclosure herein.

DETAILED DESCRIPTION OF THE INVENTION

Figure 1:
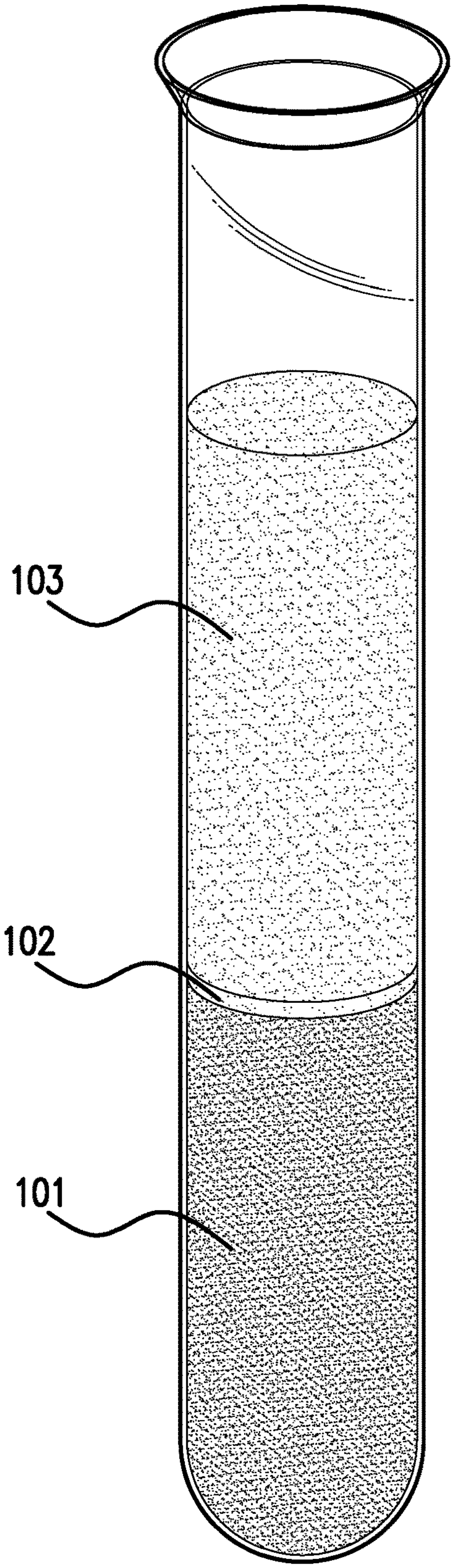
FIG. 1 is a drawing of a centrifuge tube depicting the location of the buffy coat layer 102 (the layer containing the white blood cells, i.e. the leukocytes and platelets) of an anticoagulated blood sample following centrifugation of the blood sample. Also indicated are the layer containing the red blood cells 101 (the erythrocytes), and the plasma layer 103 (the clear fluid layer). Typically, the buffy coat layer typically makes up less than about 1 percent by volume of the blood sample whereas the plasma layer makes up about 55 percent and the red blood cells about 45 percent.

As described above, current methods for selectively recovering target liquid samples from a larger sample have disadvantages. Although it is highly desirable to quickly and quantitatively remove the buffy coat layer from an anticoagulated blood sample, current methods do not reliably recover the entire buffy coat and require tedious and difficult laboratory techniques such as density gradient centrifugation. Moreover, some of these methods are cost-prohibitive and/or time-consuming and/or complicated, and can require specialized and expensive equipment. The present invention addresses these unmet needs, and provides devices and methods that can be used on anti-coagulated blood samples that have been processed by ordinary centrifugation.

The present invention relates to devices and methods for easily and reliably collecting the entire buffy coat from a blood sample. These devices and methods are also more generally useful for removing a target liquid sample fraction from a larger liquid sample. Additionally, these devices and methods are readily adapted for the isolation of circulating tumor cells (CTCs) from a biological sample.

The present invention comprises liquid sample collection devices, which can be used either separately or together. The first device (Device 1) comprises an array of capillary tubes configured for optimal surface area coverage for contact with and removal of the buffy coat layer from an anticoagulated blood sample. The second device (Device 2) comprises an array of swabs, such as flocked swabs, for absorbing the buffy coat layer. The third device (Device 3), comprises a cylindrical solid comprising a plurality of bores parallel to the axis of the cylindrical solid and running the entire length of the cylindrical solid configured for optimal surface area coverage for contact with and removal of the buffy coat layer from an anticoagulated blood sample.

Each of these devices can be used alone to collect the biological sample. The devices can also be used in conjunction with each other, i.e. sequentially, in some instances, to more efficiently and quantitatively collect the biological sample. In one embodiment of the present invention, Device 1 is used alone to collect and dispense the biological sample. In another embodiment of the present invention, Device 2 is used alone to collect and dispense or transfer the biological sample. In another embodiment of the present invention, Device 3 is used alone to collect and dispense the biological sample. When a device is used alone, it can be used one time to collect and dispense or transfer the sample or it can be used multiple times, e.g. two or more times sequentially to collect the sample and dispense or transfer the sample into another receiving container such as a collection tube.

In another embodiment of the present invention, Device 1 is first used followed by the Device 2 to collect and dispense or transfer the biological sample. In another embodiment of the present invention, Device 1 is first used followed by the Device 3 to collect and dispense or transfer the biological sample. In another embodiment of the present invention, Device 2 is first used followed by Device 1 to collect and dispense or transfer the biological sample. In another embodiment of the present invention, Device 2 is first used followed by the Device 3 to collect and dispense or transfer the biological sample. In another embodiment of the present invention, Device 3 is first used followed by the Device 1 to collect and dispense or transfer the biological sample. In another embodiment of the present invention, Device 3 is first used followed by the Device 2 to collect and dispense or transfer the biological sample.

Definitions

As used herein, the following terms and abbreviations have the indicated meanings unless expressly stated to the contrary.

The term "anticoagulated blood" as used herein means a blood sample that has been treated with an anticoagulant, such as heparin or EDTA (ethylenediaminetetraacetic acid), to prevent coagulation during processing and analysis. Blood collection tubes are commercially-available pre-coated with a heparin salt such as ammonium, lithium, or sodium heparin, or with EDTA.

The term "buffy coat" as used herein means the buff-colored layer resulting from the centrifugation of an anti-coagulated blood sample. The buffy coat contains most of the blood cells and platelets. Typically, the buffy coat represents less than about 1% of the blood sample, with the plasma accounting for about 55%, and the red blood cell layer about 45%. The buffy coat layer is formed or "sandwiched" between the red blood cell or erythrocyte layer, which is below, and the clear plasma layer which is above. See FIG. 1. The buffy coat is useful for extracting relatively large quantities of genomic DNA, for purposes including diagnostic assays.

The terms "flocked" or "flocking" as used herein with respect to the swabs of the present invention, means a swab or liquid removal device containing many small fiber particles, i.e. "flock" on its surface. The purpose of the flocking is to increase the liquid absorption properties of the swab. In some aspects, the flock is made up of natural or synthetic fibers that can have the appearance of tiny hairs. The fiber lengths and thicknesses can be varied. The flocking process is achieved by applying the fibers to adhesive coated surfaces using the application of a high-voltage electric field. The flock is usually given a negative charge, while the substrate to which the flock is to be added if grounded.

Figure 2:
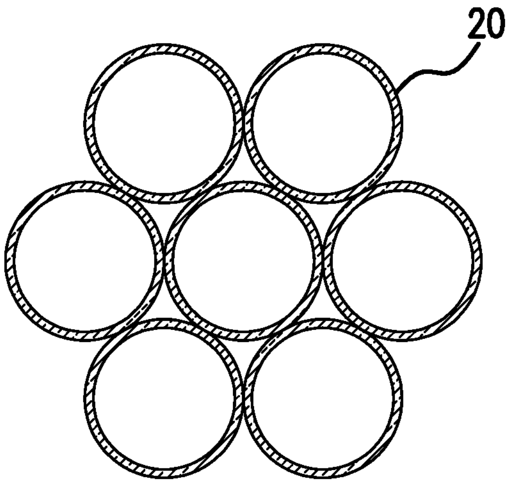
FIG. 2 shows a two-dimensional representation of a hexagonal packing pattern for seven circles 20 of equal diameter.
Figure 4:
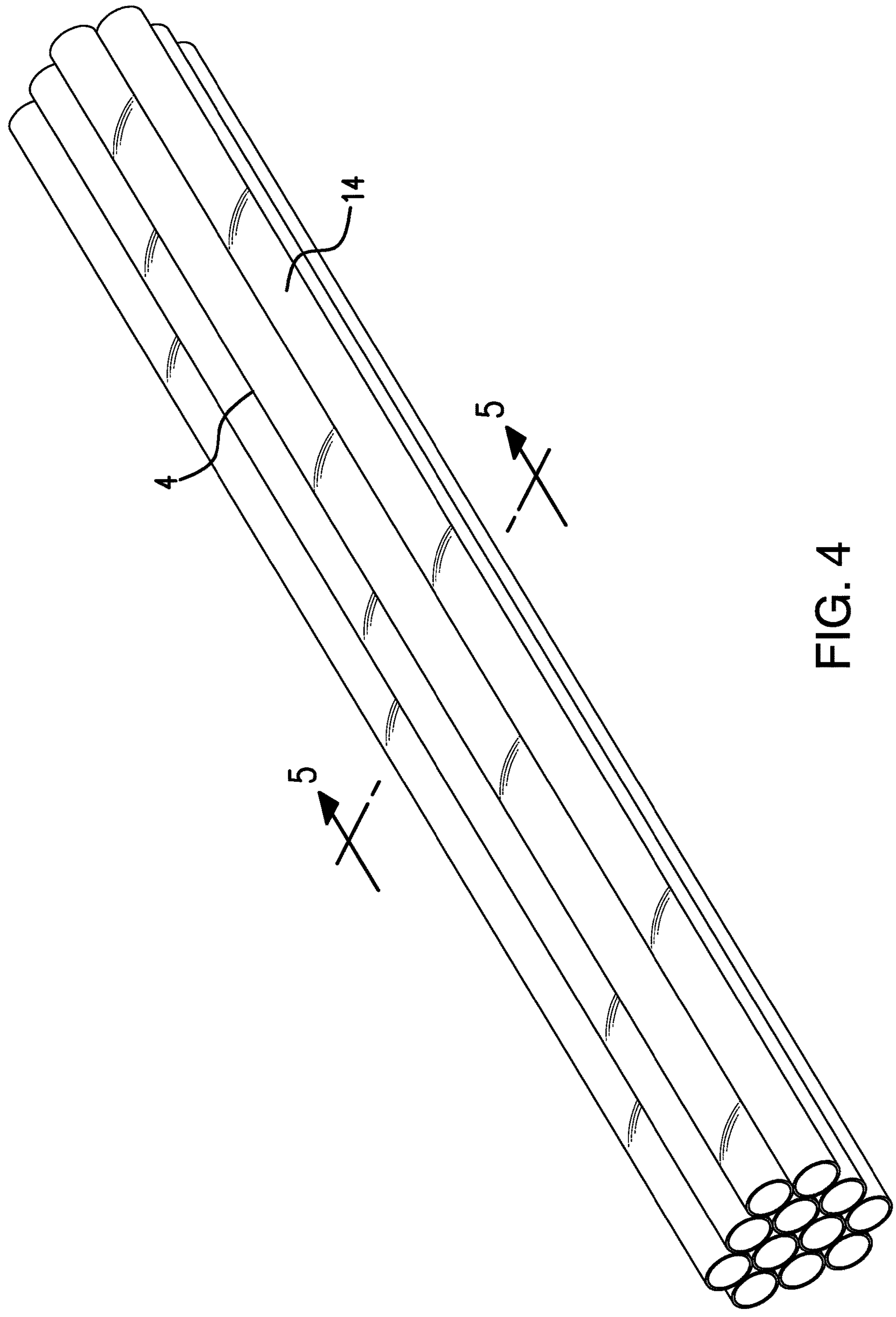
FIG. 4 is an example of the capillary tube array portion 4 of Device 1 of the present invention comprising a plurality of hexagonally-packed capillary tubes 14, such as an array of twelve hexagonally-packed capillary tubes. A cross-sectional view 5 is shown in FIG. 5.

The term "hexagonal" packing as used herein refers to the planar packing of circular objects of equal size in a symmetrical and dense packing arrangement or pattern. A hexagonal packing arrangement of equal-sized circles is shown in FIG. 2. As seen in this arrangement, a central circle is surrounded by a ring of six circles. The hexagonal packing arrangement provides a very high packing density of 0.9069, and for a circular array of seven equal-sized circles within a larger circle surrounding and touching all of the six outer circles, would represent a packing density of 0.777. The term "hexagonal" packing as used herein is also intended to include partial or extended planar arrays of three or more circles such that the circles are in staggered rows. For example, such an array is shown in FIG. 4 as demonstrated by the cross section formed by 12 circular tubes stacked in an arrangement of a row of three tubes, stacked against a row of four tubes, stacked against a row of three tubes, stacked against a row of two tubes. If this arrangement is distorted to provide a perfect three-fold axis of symmetry (the axis being perpendicular to the plane of the circles), the density of this arrangement can be maximized at 0.7392. This further distorted arrangement is considered herein to be a partial hexagonal or approximately hexagonal arrangement.

The term "triangular" packing as used herein refers to the planar packing of three circular objects of equal size in a symmetrical and dense packing arrangement roughly defining a triangle and which can be circumscribed by a larger circle. Such an arrangement would have a packing density of 0.6466 with a larger circle touching each of the three inner circles.

The term "capillary tube" as used herein is a tube with an appropriately small diameter to hold a liquid or liquid sample by capillary action. The capillary tubes of the present invention are effective for being used in an array (i.e. more than one capillary tube arranged in a packing pattern) in conjunction with a suction or vacuum means in order to withdraw a liquid sample, such as a buffy coat layer in a centrifuged anticoagulated blood sample, and dispense said sample into a receiving container. The capillary tubes of the present invention may be transparent, translucent, or opaque and may be made of materials such as glass, polymers, metal, or any suitable material. Preferably, the capillary tubes are transparent or translucent to allow the user to observe the withdrawn sample. Especially preferred are transparent capillary tubes. In some embodiments the capillary tube device can have markings or etchings to indicate predetermined volumes for readily measuring or determining the amount of material drawn up into the device.

The term "adhesive" as used herein is any appropriate adhesive securing means to assemble or affix one or more capillary tube or flocked swab components to prepare a device component. Some embodiments of the present invention do not require an adhesive. In embodiments that include an adhesive, the adhesive is selected from the group consisting of tape, paste, glue, mucilage, epoxy, cement, resin, a hot melt adhesive, and combinations thereof. In other embodiments, any appropriate adhesive or non-adhesive securing means can be used to prepare the devices of the present invention.

The term "in contact" as used herein is used to describe the proximity of one or more capillary tube or flocked swab components with one another. Generally, the term means that the outer surface of said components are in contact. In some embodiments, an adhesive layer may provide the point of contact between the one or more components. In such embodiments where an adhesive layer provides the point of contact between the one or more components, the components should still be considered to be "in contact".

The term "parallel array" as used herein is used to describe the relative orientation of one or more capillary tube or flocked swab components with respect to one another. In general, the term means that the one or more components are essentially or approximately parallel to one another. In embodiments employing flocked swabs where the flocked material portions are in contact, it can be appreciated that due to the larger outer diameter of the flocked material compared to the diameter of the supporting rod, the supporting rods will not necessarily be exactly parallel to one another if they are drawn together to form a point of contact for, in example, embodiments where a securing or affixing means are used. The relative degree to which the supporting rods are parallel to one another depends upon the diameter of the flocking material and, therefore, the term "parallel array" with respect to embodiments employing flocked swabs should be taken to generally describe groupings of two or more flocked swabs oriented in the same direction without stringent limitations on the degree to which the supporting rods are parallel with one another.

The term "bore" as used herein is used to describe a bore, hole, or continuous channel through the length of the devices of the present invention. The term may be used in the context of the cylindrical solid embodiments of the present invention and describe any such bore, hole, or channel that spans the length of the cylindrical solid and allows for vacuum or aspiration to be applied from one end of the device where the vacuum or aspiration means are connected to the other end of the device that can be contacted with a liquid sample. Therefore, the terms bore, hole, or channel are considered to be synonymous. In some embodiments, the bore, hole, or channel is added to a cylindrical solid by drilling, machining, or boring. In some embodiments, the bore, hole, or channel is molded into the cylindrical solid in embodiments where molding or injection molding are used to produce the cylindrical solid. In some embodiments where the cylindrical solid is 3D printed, the bore, hole, or channel is produced by 3D printing. The present invention contemplates any other type of bore, hole, or channel, or any method of producing a bore, hole, or channel in a cylindrical solid device.

General Aspects of the Devices

The devices of the present invention can be tailored in their components and dimensions for a wide variety of applications. Particularly useful are devices that are compatible with and designed to collect portions of samples from laboratory test tubes. These laboratory tubes are available in a variety of volume capacities, and dimensions. An example of such a laboratory test tube is the standard 4 ml blood collection tube. In some aspects these tubes are available with EDTA spray-coated on the interior wall of the tube, which is an anticoagulant used for most hematology procedures. Examples of EDTA compositions include $K_2$EDTA (dipotassium ethylenediaminetetraacetic acid) and K3EDTA (tripotassium ethylenediaminetetraacetic acid).

These 4 ml collection tubes generally have an outer diameter of about 13 mm and a length of about 75 mm.

Examples of Such Commercially Available Tubes Include:

Becton Dickinson BD 368021 Vacutainer Plastic Blood Collection Tube with K2EDTA Hemogard, 1000 per Case: 4 mL, 13×75 mm, Lavender Greiner Bio-One Lavender K2 EDTA Tubes 4 ml 50/bx Accounting for the wall thickness of these commercially available collection tubes, it is preferable that the devices of the present invention have a total diameter such that they are compatible with and conveniently fit into desired collection tube to allow for easy removal of the desired sample component. Therefore, in some embodiments of the present invention, the devices should have a largest diameter slightly or substantially smaller than the inner diameter of the desired collection tube. It can be appreciated that the present invention contemplates devices of various sizes depending upon the inner diameter of the collection tubes utilized. While the overall largest diameter of the device may be enlarged, it may not be, in some embodiments, advantageous to increase the diameter of capillary tubes or bores of the device that rely on capillary action to withdraw and hold the withdrawn sample. Therefore, in embodiments comprising an array of capillary tubes (Device 1), more tubes may be added or the outer diameter of one or more of the capillary tubes may be adjusted in order to optimize the device for a given collection tube. In embodiments comprising a cylindrical solid with bores or holes (Device 3), it may be advantageous to increase the number or arrangement of bores or holes if the outer diameter of the device is increased in order to optimize the device for a given collection tube. For flocked swab device embodiments (Device 2), the number of swabs or the dimensions of the swabs could be adjusted in order to obtain a largest diameter of the flocked swab end of the device that is optimized for the inner diameter of the collection tube. It can be appreciated that the flocking material is compressible and therefore, a flocked swab device may have a largest diameter slightly or substantially larger than the inner diameter of the collection tube. In further embodiments, the flocked swab device may have a largest diameter slightly or substantially smaller than the inner diameter of the collection tube.

Furthermore, the devices of the present invention should have an overall length sufficient to allow the user to access the desired portion of the sample in the tube and yet are not too long to be unwieldy or cumbersome to use. One of ordinary skill in the art can design and modify the dimensions of the devices of the present invention to be compatible with various laboratory collection tubes.

Devices 1 and 3 are preferably intended for use in conjunction with an aspiration or vacuum means for withdrawing the sample, such as a pipetting device. Therefore, the devices should be of a proper dimension to be fitted with or into such an aspiration or vacuum means. Various aspiration or vacuum means can be employed, including commercially available devices such as pipette controllers. An example of such a pipette controller is the Drummond Pipet-Aid XL.

Transparency: In some embodiments, the Devices 1 and 3 of the present invention are transparent or translucent, to permit the user to more easily view the retrieval of the liquid sample, particularly when it is a colored sample such as a blood sample. Transparency is particularly preferred for Devices 1 and 3. Examples of transparent and translucent materials for the construction of Devices 1 and 3 includes those selected from the group consisting of glass and polymeric materials or filaments such as those selected from the group consisting of polylactic acid (PLA), acrylonitrile butadiene styrene (ABS), polycarbonate (PC), polyethylene terephthalate glycol (PETG); and poly(methyl methacrylate) (PMMA).

Markings: In some embodiments the devices of the present invention can have markings such as lines or etchings to visually assist the user with drawing a specific volume or amount of sample into the device. These markings can help ensure that the desired amount of the sample is withdrawn.

Assembly: In some embodiments of the present invention, the devices are assembled from one or more components, such as capillary tubes or flocked swabs, into a group or array using a securing or affixing means. In some embodiments, the securing or affixing means is an adhesive. In other embodiments, the securing or affixing means is a non-adhesive. In further embodiments, more than one securing or affixing means may be applied, such as both an adhesive and a non-adhesive securing or affixing means. Non-adhesive securing or affixing means include, but are not limited to, a cable tie, wire, a string or monofilament, a clamp, an elastic band or rubber band, hook and loop straps (such as Velcro®) combinations thereof, or any other appropriate securing or affixing means. In further embodiments, the securing or affixing means is a molded, 3D-printed, or machined article designed to hold the capillary tubes or flocked swabs in the desired arrangement.

Device 1—Array of Capillary Tubes

This device comprises a multitude of capillary tubes arranged in a specific configuration, such as longitudinally in parallel to define when viewed in cross-section a roughly circular, i.e. a cylindrical array with roughly hexagonal packing. For example, the device can comprise a multitude of hematocrit capillary tubes, such as 12 tubes. The tubes are arranged to provide optimal surface area coverage for contact with the buffy coat layer after centrifugation. The small diameter of each capillary tube, such as 1.1 mm, allows for more careful and controlled removal of the buffy coat, compared to a single pipette tip, of e.g. 1 ml inner bore diameters.

As described above, Device 1 comprises (i) a plurality of capillary tubes, e.g. 12 tubes. Each of these tubes is open at both ends and thus comprises a first end comprising an aperture, and a second end comprising an aperture. The plurality of tubes comprises a parallel array such that the first end and second end of the tubes are directionally aligned with each other. The tubes are also in contact with each other such that at least one tube is in contact with a least another tube.

As shown above, FIG. 2 illustrates a two-dimensional representation of a hexagonal packing pattern for objects having a circular cross section. Even though a hexagonal array of seven capillary tubes provides good packing density, the overall diameter of the array is smaller than is optimal.

Figure 3:
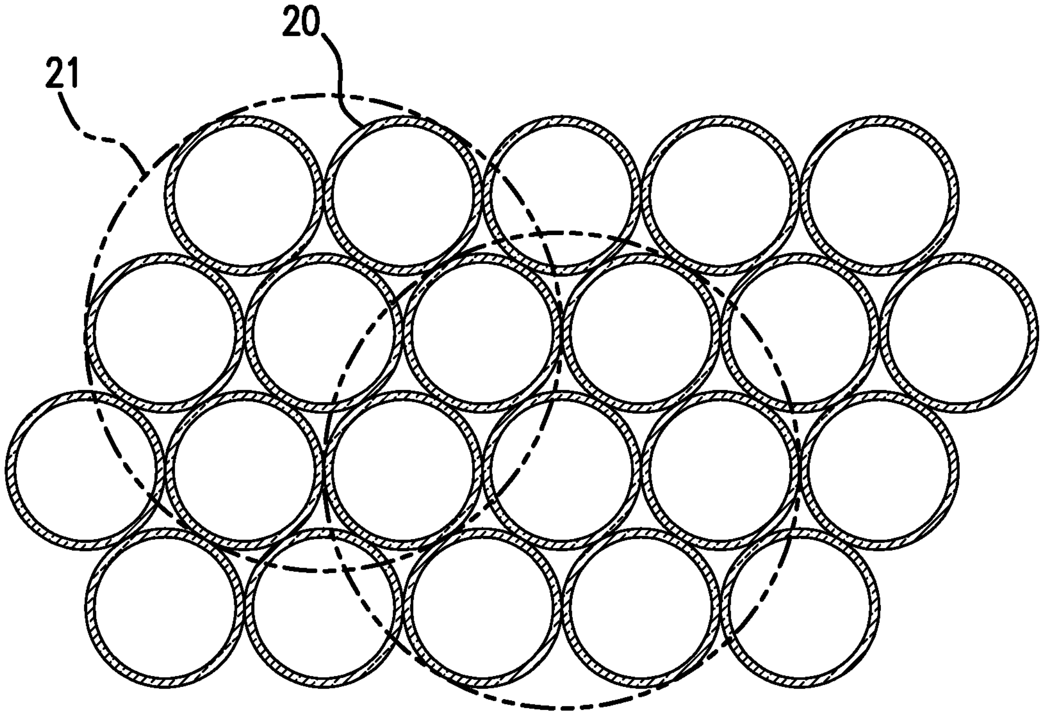
FIG. 3 shows a two-dimensional representation of a portion of a hexagonal packing pattern for a multitude of circles 20 of equal diameter. The hexagonal nature of the packing is illustrated by the dashed larger circles 21 showing groups of seven circles forming a hexagonal packing unit.

As discussed above, FIG. 3 shows a two-dimensional representation of a portion of a hexagonal packing pattern for a multitude of circles of equal diameter. The hexagonal nature of the packing is illustrated by the larger circles showing groups of seven circles. Such a hexagonal packing array can be expanded to provide other roughly symmetrical or circular arrays.

It is been found in the present invention that a roughly circular array of 12 capillary tubes in a hexagonally-based packing arrangement, where each tube having an inner diameter of about 2 mm and an outer diameter of about 2.5 mm, provides a convenient size array in terms of overall diameter for collection of the buffy coat layer from a standard centrifuge tube having dimensions of about 7.5 cm long by about 1.2 cm wide. This array is formed by stacking a row of three tubes, against a row of four tubes, against a row of three tubes, against a row of two tubes, which represents a hexagonal packing array. When rotated, this array is seen to have a three-fold axis of symmetry and to provide a roughly triangular or circular array. This arrangement of 12 tubes is shown in the perspective view of FIG. 4 and also in the cross-sectional view of FIG. 5.

Other arrays can be used depending on the choice of outer tube diameters and the constraints of the diameter or opening of the container holding the liquid sample to be sampled (i.e. the collection tube).

Useful inner diameters of the capillary tubes range from about 0.1 mm to about 5 mm, or from about 0.5 to about 2.5 mm, or from about 0.9 mm to about 1.1 mm, or a diameter of about 1 mm.

Useful outer diameters of the capillary tubes range from about 0.2 mm to about 10 mm, or from about 0.2 mm to about 5 mm, or from about 0.6 to about 2.5 mm, or from about 1 mm to about 1.1 mm.

It should be appreciated that one of skill in the art could envision other inner and outer diameters with inner diameters ranging anywhere from 0.1 mm to 5 mm with increments of 0.1, 0.05, or 0.01 mm or other increments to custom tailor an inner diameter and with outer diameters ranging anywhere from 0.2 mm to 10 mm with increments of 0.1, 0.05, or 0.01 mm or other increments to custom tailor an outer diameter.

Regarding the length of the tubes, a wide variety of lengths can be used. It is important that each capillary tube of the array has the same length to provide a composite array where the first ends and the second ends of the tubes are evenly aligned. The overall length of the capillary tubes should be such that they can each contain a sufficient volume of liquid, for example about 10 microliters to about 15 microliters, and are long enough to extend into the centrifuge tube or other vessel containing the liquid sample to be sampled.

Some useful tube lengths range from about 30 mm to about 150 mm, about 40 mm to about 100 mm, about 45 mm to about 75 mm, or from about 55 mm to about 75 mm, or from about 65 mm to about 75 mm. It should be appreciated that one of skill in the art could envision other lengths or lengths ranging anywhere from the 30 to 150 mm with increments of 1, 0.5, or 0.25 mm or other increments to custom tailor an optimized length.

Figure 5:
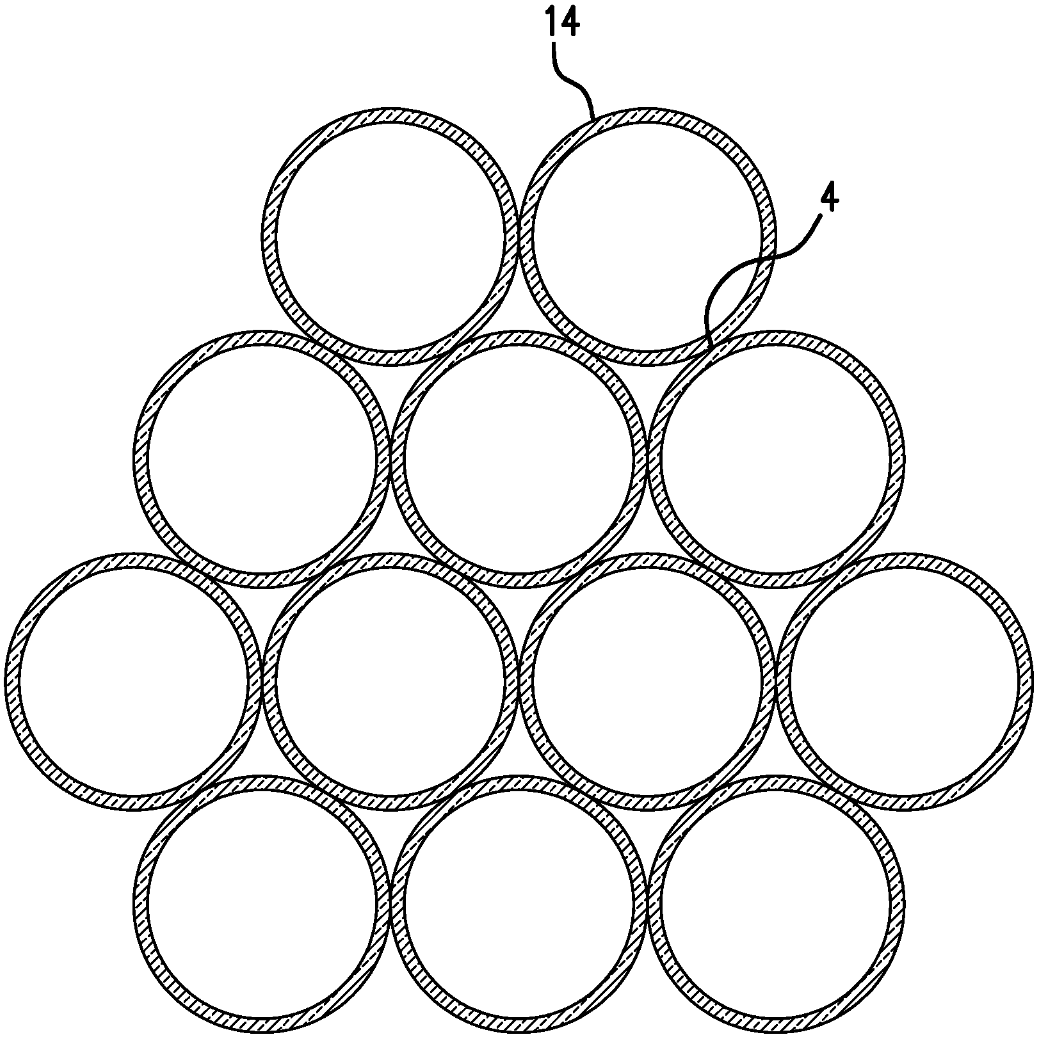
FIG. 5 is a cross-sectional view 5 of the capillary tube array portion 4 of Device 1 of FIG. 4 showing the individual capillary tubes 14.
Figure 6:
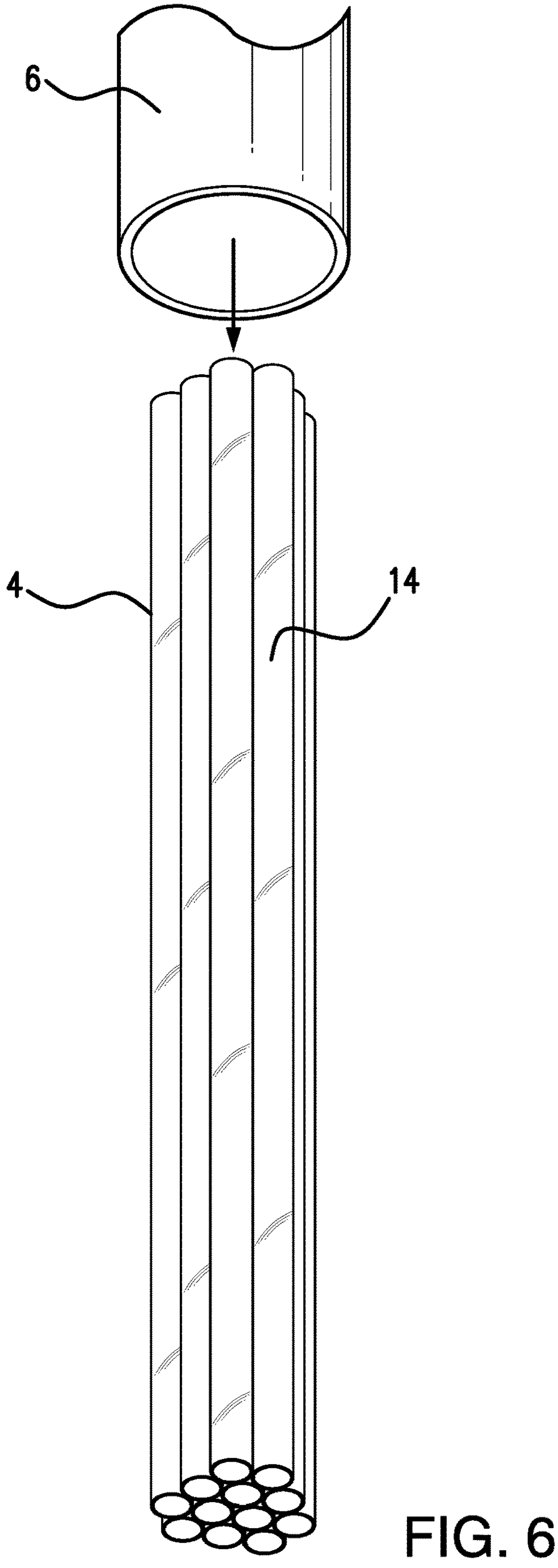
FIG. 6 is an exploded perspective view of the capillary tube array portion 4 of Device 1 and an aspiration or vacuum means 6.

FIG. 6 is an exploded perspective view of the tube array portion of the Device 1, a portion of which is shown in FIG. 5, and an aspiration or vacuum means to aid with sample withdrawal and dispensing. Various aspiration or vacuum means can be employed, including commercially available devices such as pipette controllers. An example of such a pipette controller is the Drummond Pipet-Aid XL.

Although Device 1 can comprise a multitude of capillary tubes, alternative embodiments are contemplated as being within the scope of the invention Device 1 can be constructed from a glass or plastic material to be essentially transparent or translucent to allow for ready visualization of the sample uptake.

An alternative device can be constructed by molding the object as a single piece, or can be made by drilling or boring a solid cylindrical blank piece of appropriate dimensions and shape. Alternatively the device can be printed by three-dimensional (3-D) printing techniques. This alternative Device 1, can also be used in conjunction with an aspiration means.

Device 2—Array of Flocked Swabs

This device, Device 2, comprises a multitude of flocked swabs arranged in a specific configuration, such as longitudinally in parallel to define when viewed in cross-section a roughly circular, i.e. a cylindrical array. For example, the device can comprise a multitude of flocked swabs, such as 3 swabs. As with Device 1, the flocked swabs are arranged to provide optimal surface area coverage for contact with the buffy coat layer after centrifugation. The relatively large and efficient absorption capacity of the flocked swabs allows for more quantitative removal of the buffy coat, compared to a single pipet tip, of e.g. 1 ml inner bore diameters. In particular, Device 2 is useful for buffy coat removal after a first pass removal by Device 1.

As described above, Device 2 comprises an array of flocked swabs, preferably 3 or more arranged in a circular pattern. It has been found that 3 swabs represents a convenient number, because 3 swabs of a convenient diameter when configured together can be conveniently used to sample a standard centrifuge tube having dimensions of about 7.5 cm long by about 1.2 cm wide.

The flocked swabs are designed to have a supporting means, such as a stick or rod, with the tip of the support covered with the flocked material, i.e. fibers. It is preferable that the fibers are arranged or ordered parallel to each other and perpendicular to the stick or rod.

A wide range of fibers, both natural and synthetic, as well as combinations of the two types or fiber blends can be used, provided they have the desired hydrophilic and capillary properties. Such materials include, cotton, silk, nylon, rayon, polyester, polyamide, carbon fiber, and alginate.

The swabs have a tip covered with a layer of fiber, which can be of a uniform thickness. These thickness values can range from about 0.5 to about 5 mm, or from about 0.6 to about 3 mm. The fiber count, which is defined in weight in grams per 10,000 linear meters of a single fibers if from about 1 to about 5 Dtex, or about 1.5 to about 4 Dtex, or about 1.7 to about 3.3 Dtex.

The swabs can be designed with varying absorption capacity, which can range from about 10 microliters to about 1000 microliters (μL) per swab. Other ranges are from about 40 microliters to about 200 microliters, or about 60 microliters to about 100 microliters. In other embodiments, each swab should be capable of absorbing at least about 40 microliters of liquid, or at least about 60 microliters, or at least about 100 microliters. It will be recognized that the absorption capacity of an array of swabs would roughly be equal to the sum of the absorption capacity of each swab, recognizing that the close proximity and contact of the multiple swabs can cause some variation from being strictly additive.

Figure 8:
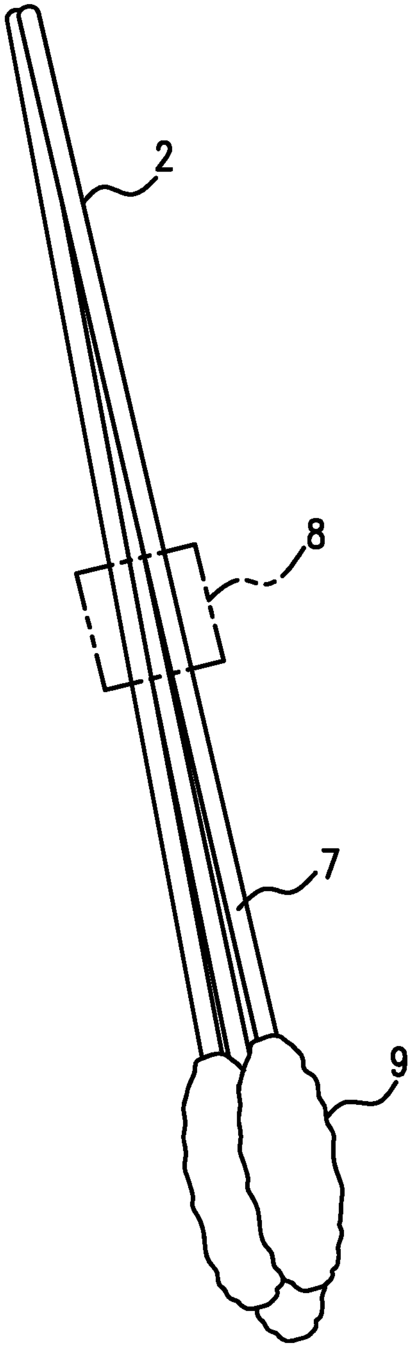
FIG. 8 is an example of an embodiment of Device 2 (2) of the present invention comprising a plurality of flocked swabs having a supporting rod 7 and flocking material 9. An optional adhesive or non-adhesive securing means 8 can be added along any portion of the length of the device.
Figure 9:
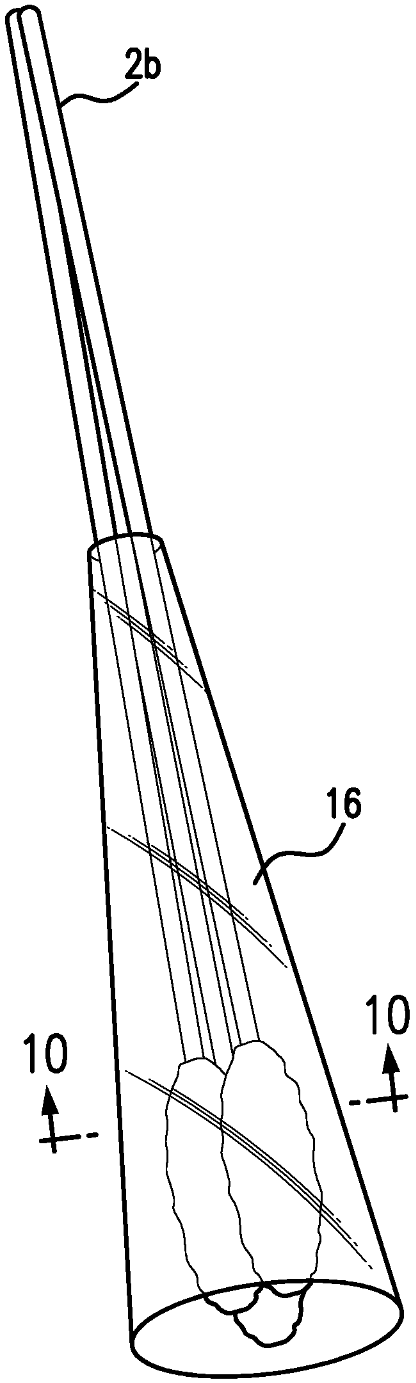
FIG. 9 is an example of an embodiment of Device 2 (2*b*) of the present invention as shown in FIG. 8 further comprising an optional sheath 16. A cross section 10 is shown in FIG. 10. The optional adhesive or non-adhesive securing means 8 is not shown. A cross-sectional view 10 is shown in FIG. 10.

FIG. 8 is an example of the flocked swab portion of Device 2 of the present invention comprising 3 flocked swabs in a symmetrical and roughly triangular or circular arrangement. FIG. 9 is an example of Device 2 with an optional sheath.

Figure 10:
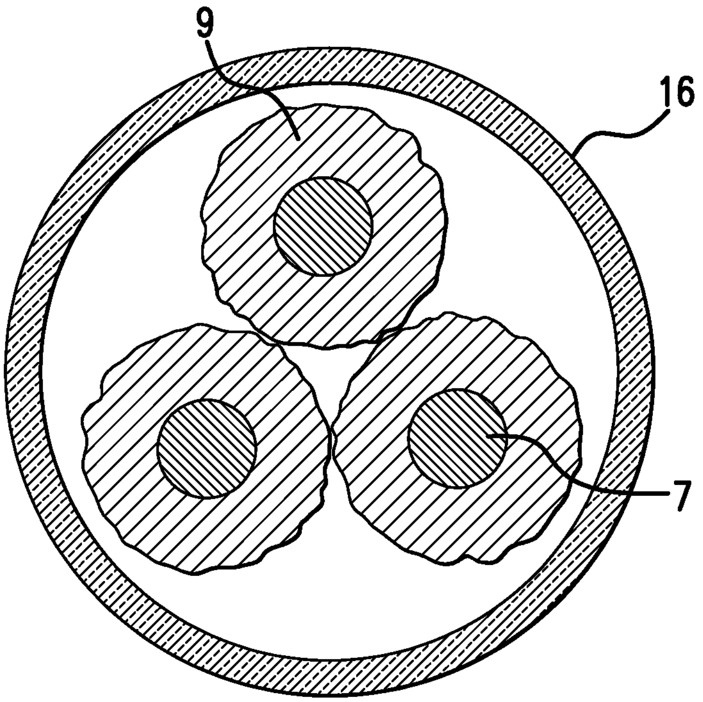
FIG. 10 is a cross-sectional view 10 of the flocked swab array portion of the device of FIG. 9. The supporting rod 7 and flocking material 9 are shown. An optional sheath 16 is also shown.
Figure 11:
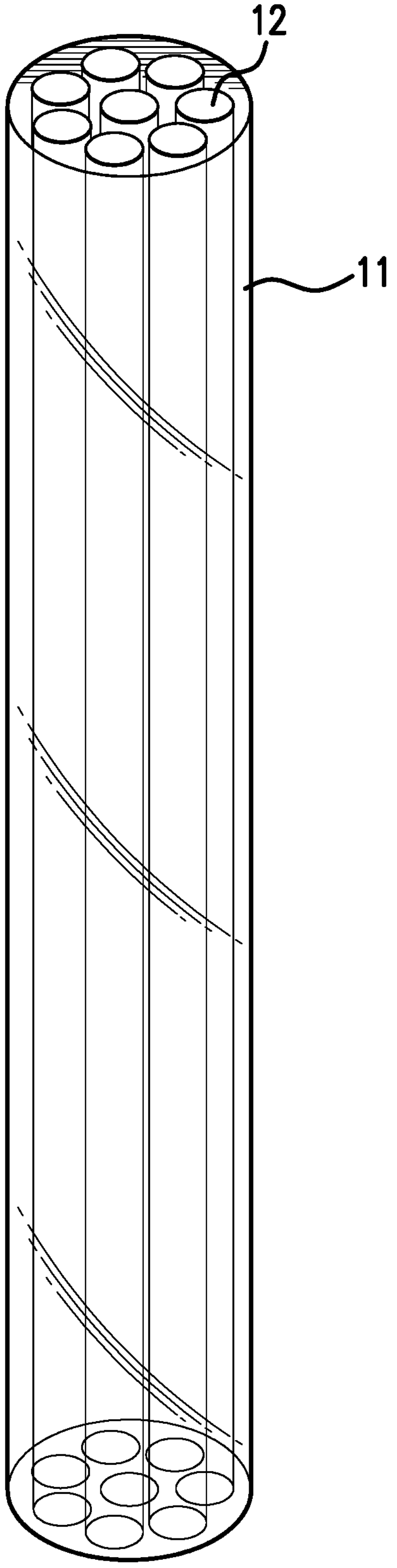
FIG. 11 shows an embodiment of the cylindrical solid portion 11 of Device 3 with a plurality of parallel bores 12 through the length of the cylindrical solid, such as a symmetrical circular array of 8 bores (a central bore and 7 circularly and symmetrically arranged bores).
Figure 12:
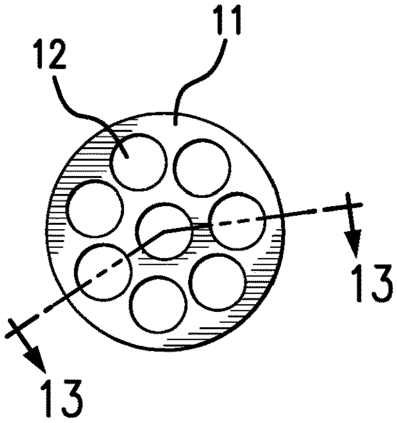
FIG. 12 is a top-view or bottom-view of an embodiment of the cylindrical solid portion of Device 3. The cylindrical solid portion 11 and the bores 12 are shown. A cross-sectional view 13 is shown in FIG. 13.
Figure 13:
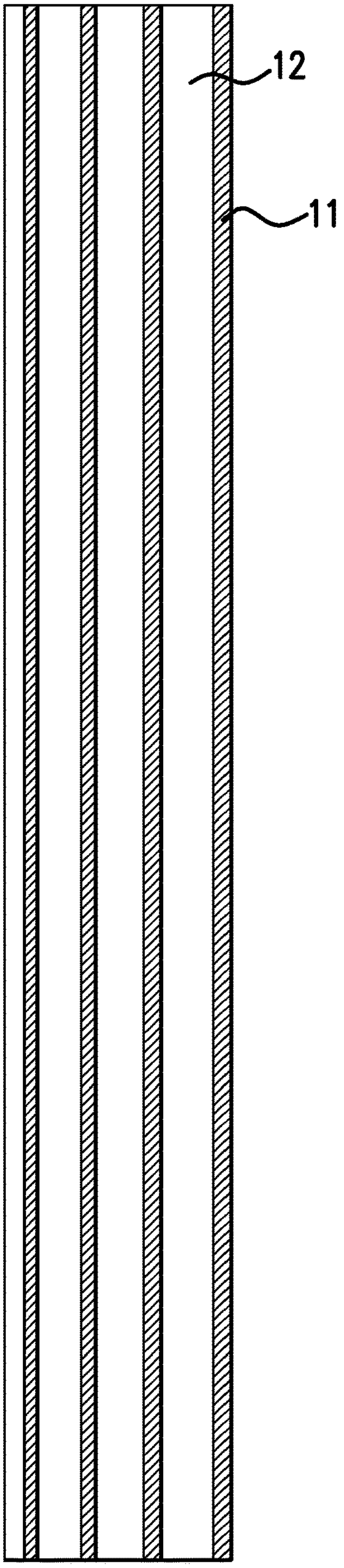
FIG. 13 is a cross section 13 of the cylindrical solid portion of Device 3 from FIG. 12. The cylindrical solid portion 11 and the bores 12 are shown.

FIG. 10 is a cross-sectional view of the flocked swab array portion of the device of FIG. 9. In this cross-sectional view an optional circular sheath is shown which surrounds the flocked swabs, or at least the swab end portion of the flocked swabs. The sheath can be made of a flexible clear plastic material such as cellophane or the like. The sheath serves to protect the flocked swabs and to help contain the sample during extraction. During storage and prior to use, the array of the flocked swabs are contained within the sheath. During sampling of the blood sample, the tips of the flocked swabs, i.e. the flock areas, are extended beyond the sheath and into the sample to effect retrieval. Upon completion of sample retrieval, the flocked swabs are retracted back into the protective sheath. The sample is then readily dispensed or transferred by extending the flocked swabs into a receptable tube for collection of the sample.

Examples of commercially available single swabs that provide background on what has been done in the past are available from Copan Italia and Puritan Medical Products Company, LLC, Guilford, Maine. However, it should be recognized that these devices are single swabs and are not a cluster of swabs, that is critical for the present invention. Such single swabs, alone, would not be useful for the devices and methods of the present invention. Furthermore, these types of swabs, when used alone are more typically used for sampling fluids in body cavities such as the nares, ear, or throat and are not intended nor originally designed for the purpose of quantitatively absorbing liquids for transfer. Such single swabs are generally individually packaged and contained within a sealable container for holding a single swab after the fluid from the body cavity has been collected. Any further transfer of the absorbed fluid samples for analysis is performed from a single swab and not a grouping of two or more swabs. The present invention in contrast utilizes an array, when viewed in two dimensions, of 3 or more flocked swabs in contact with each other for the quantitative absorption and transfer of liquids. Device 2, which comprises an array of flocked swabs has a surprising and unexpected benefit of effectively collecting the buffy coat layer of a centrifuged anticoagulated blood sample. The buffy coat sample collected by the array of flocked swabs can then be dispensed or transferred from the array of flocked swabs into a receiving container. Examples of such single swabs are described in further in the following patents and patent application publication, which are incorporated by reference herein in their entirety: U.S. Pat. No. 10,327,741, to Triva, issued Jun. 25, 2019.

U.S. Pat. No. 10,092,275, to Triva, issued Oct. 9, 2018.
U.S. Pat. No. 9,504,452, to Triva, issued Nov. 29, 2016.
U.S. Pat. No. 9,428,788, to Triva, issued Aug. 30, 2016.
U.S. Pat. No. 9,173,779, to Triva, issued Nov. 3, 2015.
U.S. Pat. No. 9,170,177, to Triva, issued Oct. 27, 2015.
U.S. Pat. No. 9,011,358, to Triva, issued Apr. 21, 2015.
U.S. Pat. No. 8,979,784, to Triva, issued Mar. 17, 2015.
U.S. Pat. No. 8,420,385, to Young et al., issued Apr. 16, 2013.
U.S. Pat. No. 8,317,728, to Triva, issued Nov. 27, 2012.
U.S. Pat. No. 8,334,134, to Young et al. issued Dec. 18, 2012.
U.S. Pat. No. 8,114,027, to Triva, issued Feb. 14, 2012.
US Design Pat. No. D772,398 to Triva, issued Nov. 22, 2016. and
PCT application publication No. WO 2004/086979, to Copan Innovation Limited, published Oct. 14, 2014.

Device 3—Cylindrical Solid with Multiple Bores

A third device (Device 3), comprises a cylindrical solid comprising a plurality of bores parallel to the axis of the cylindrical solid and running the entire length of the cylindrical solid, configured for optimal surface area coverage for contact with and removal of the buffy coat layer from an anticoagulated blood sample. The bores can be of various shapes when viewed in cross-section such as circular, elliptical or oval, triangular, rectangular or square, or other geometrical shapes such as pentagons, hexagons, or irregular shapes. The term bore is used in this context to describe a bore, hole, or channel continuous through the length of the cylindrical solid device. Each bore should be of a sufficiently small diameter to cross-sectional area to allow for efficient capillary action of the sample within the bore. Also, the number of bores and their relative position to each other should be designed to optimize the array of the bores considering packing arrangement, spacing between the bores and the outer edge of the cylinder, volume, surface area, capillary function, and manufacturing considerations. Although Device 3 in some embodiments could comprise a single bore, such a device would likely have a limited sample volumetric and withdrawal capacity considering the need to minimize the bore cross-sectional area to maintain appropriate capillary action. However, a specifically designed irregular or non-circular single bore could be used if effective to utilize capillary action. In some embodiments, one or more of the bores, holes, or channels are parallel to the length of the cylindrical solid. In some embodiments, all of the bores, holes, or channels are parallel to the length of the cylindrical solid. In some embodiments, one or more of the bores, holes, or channels are not parallel to the length of the cylindrical solid, are slightly or substantially angled, and/or are non-linear.

Considering capillarity, volume and sample withdrawal characteristics, manufacturing, and aesthetic considerations, an array of multiple bores with circular cross-sections are generally preferred. Examples of such arrays include from about 3 to about 25 circular bores, from about 6 to about 19 circular bores, from about 7 to about 13 circular bores, 7 circular bores, and 8 circular bores.

Examples of dimensions for the device can include the following. The diameter of the cylindrical solid can range from about 5 mm to about 20 mm, from about 6 mm to about 15 mm, from about 7 mm to about 14 mm, from about 8 mm to about 13 mm, and from about 9 mm to about 12 mm. Some useful lengths for the device, i.e. the length of the cylindrical solid, can range from about 40 mm (4 cm) to about 150 mm (15 cm), about 50 mm (5 cm) to about 120 mm (12 cm), and from about 55 mm (5.5 cm) to about 100 mm, about 70 mm, about 75 mm, and about 80 mm. The diameter of the circular bores can range from about 0.1 mm to about 5 mm, from about 0.5 mm to about 2.5 mm, and about 2 mm. The overall length of the device should be such that they can each bore can contain a sufficient volume of liquid, for example about 10 microliters to about 15 microliters, and the overall device is long enough to extend into the blood collection tube, centrifuge tube or other vessel containing the liquid sample to be sampled.

Figure 14:
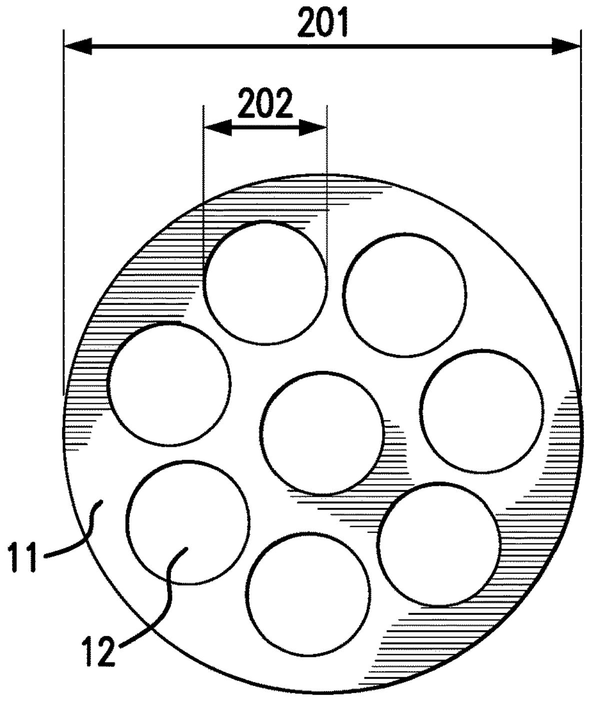
FIG. 14 is a top-view of the cylindrical solid portion 11 of Device 3 as shown in FIG. 12 with an outer diameter dimension 201 and a bore diameter dimension 202. The bores 12 are shown.
Figure 15:
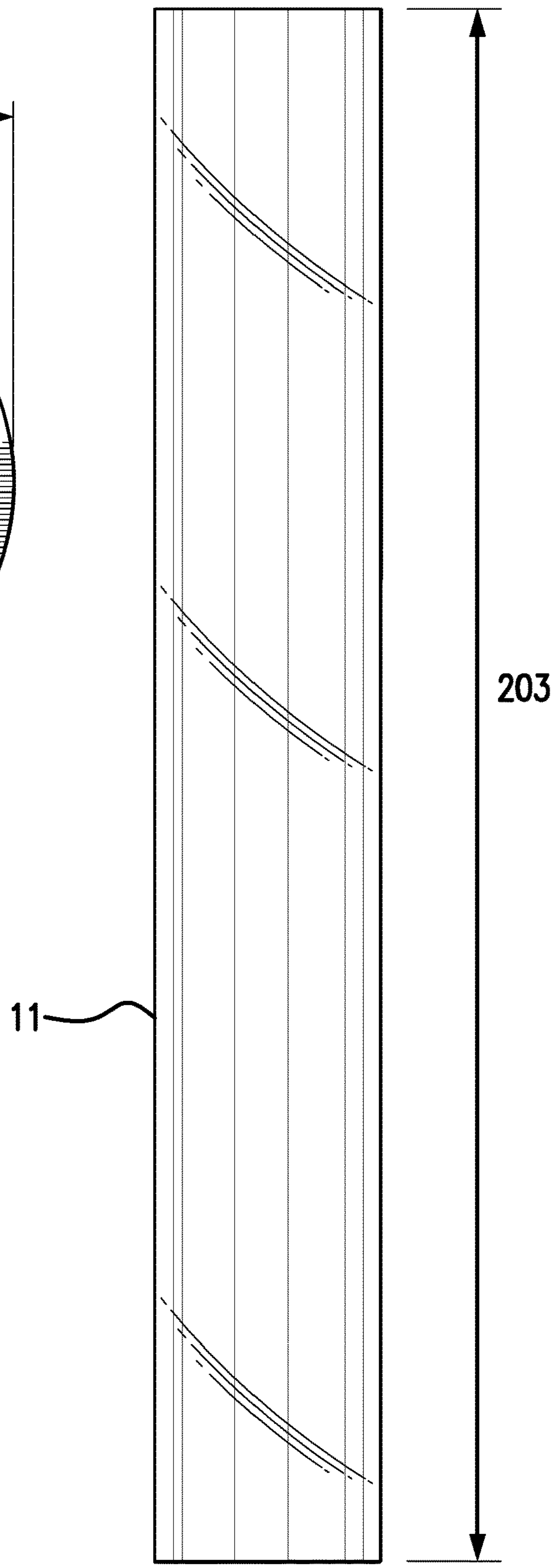
FIG. 15 shows a planar view of the cylindrical solid portion 11 of Device 3 as shown in FIG. 11 with a length dimension 203.

A nonlimiting but optimum array is a symmetrical array with a central circular bore surround by a circular array of 7 symmetrically arranged circular bores (i.e. a heptagonal array of surround bores). See FIG. 14. This array with 8 circular bores is conveniently manufactured with each bore having an inner diameter 202 of about 2 mm and an overall diameter of the cylindrical solid (201) of about 9 mm to about 12 mm to allow for the device to be readily inserted into a 13 mm (outside diameter) standard 4 ml laboratory blood collection tube. The overall dimensions of the device and the number and arrangement of bores can be optimized for a given collection tube. The bore diameter (202) should generally be an appropriate diameter for capillary action to occur, however in some embodiments a substantially different bore diameter or size could be appropriate depending upon the sample or other factors. It should be appreciated that one of skill in the art could envision other solid cylinder lengths, diameters, or inner bore diameters with increments of 1, 0.5, or 0.25 cm or other increments to custom tailor an optimized length, or with increments of 0.1, 0.05, or 0.01 mm or other increments to custom tailor optimized solid cylinder diameters or inner bore diameters.

This number of 8 circular bores, their array and device dimensions allows for the device to have sufficient structural integrity. For example, if the bore diameters are too large, if there are too many bores, and if the bores are too closely oriented or "packed", the integrity and function of the device could be compromised.

Figure 16:
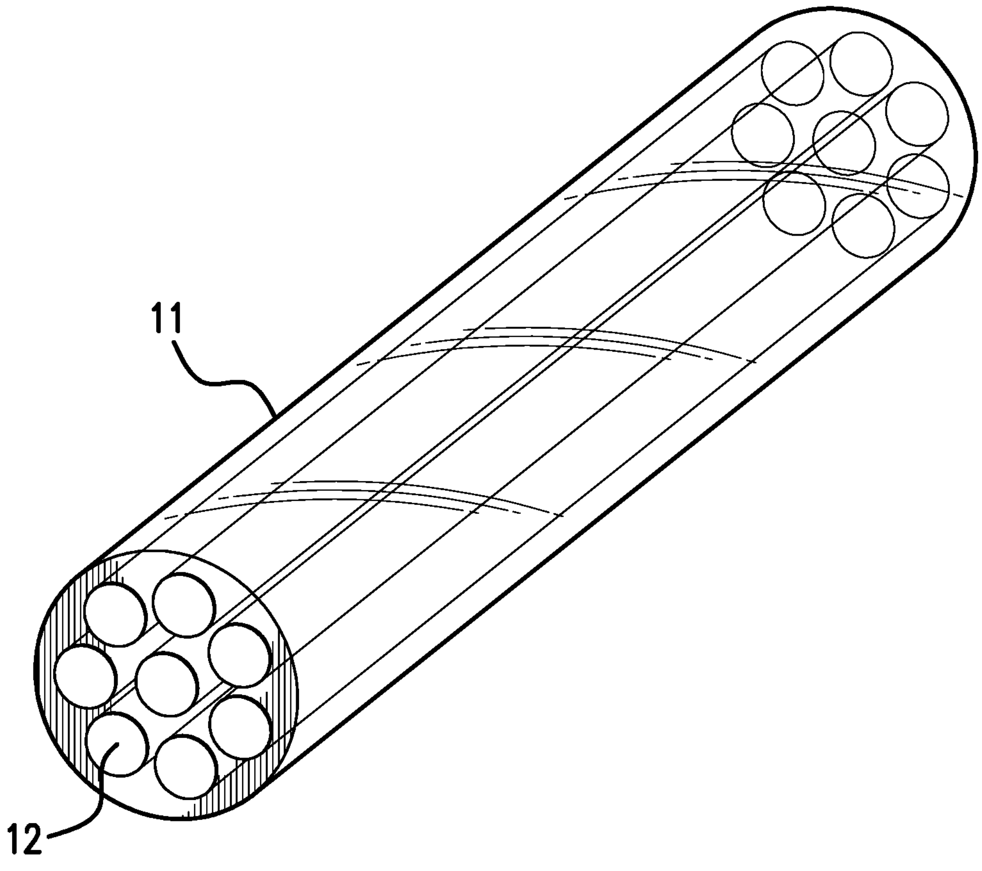
FIG. 16 is a perspective view of the cylindrical solid portion 11 of Device 3. The bores 12 are shown.
Figure 17:
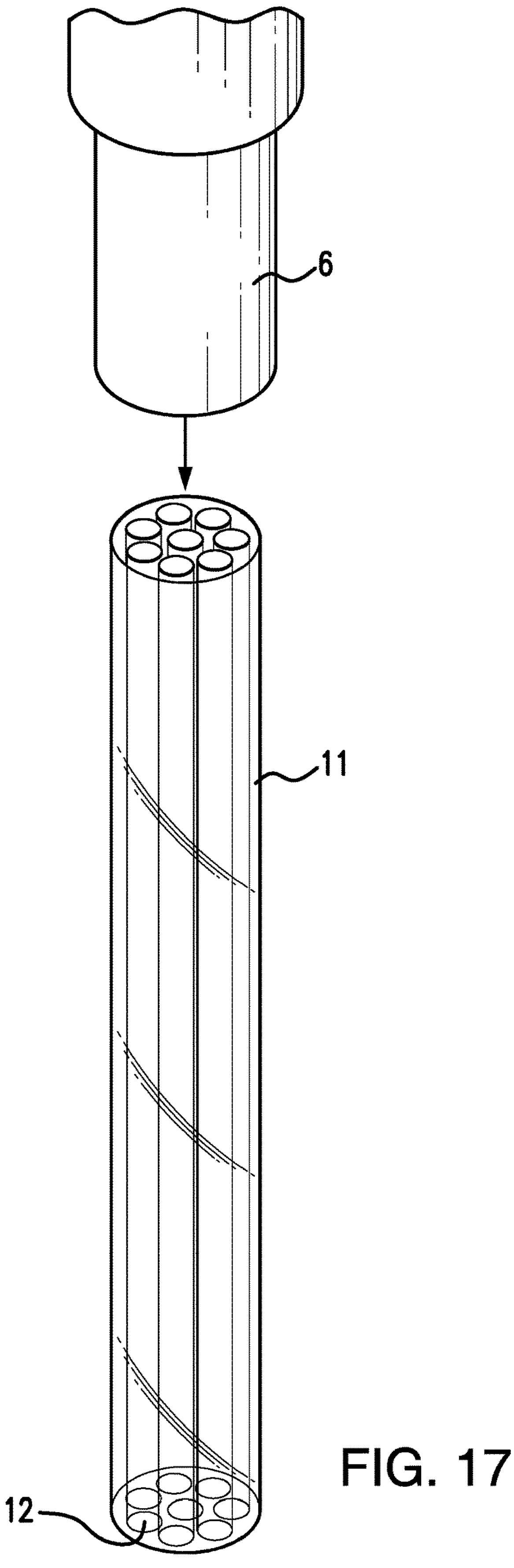
FIG. 17 is an exploded perspective view the cylindrical solid portion 11 and an aspiration or vacuum means 6. The bores 12 are shown.
Figure 18:
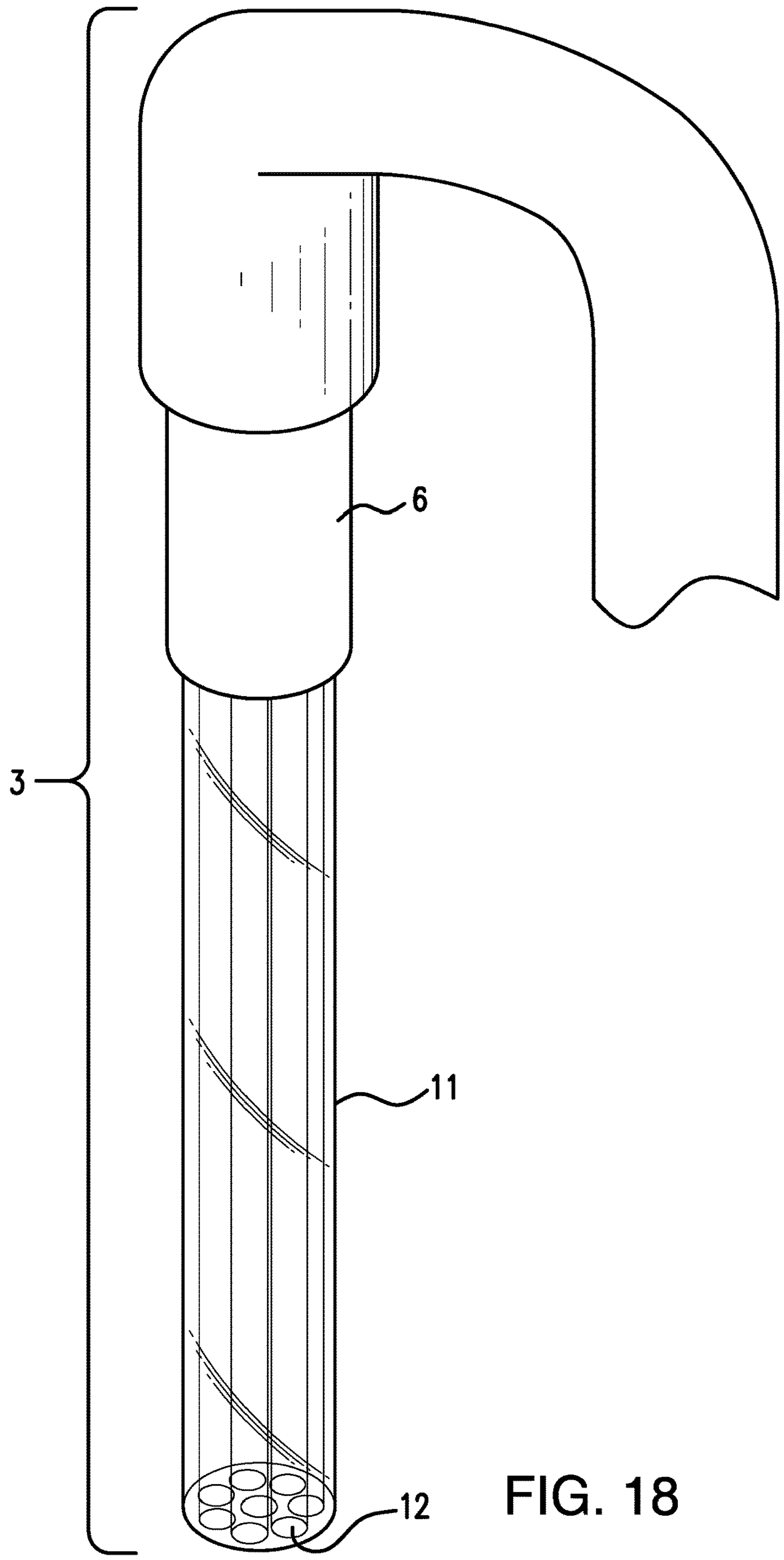
FIG. 18 shows a perspective view of an embodiment of Device 3 (3) comprising the cylindrical solid portion 11 coupled to an aspiration or vacuum means 6. The bores 12 are shown.

FIG. 17 is an exploded perspective view of the bored cylindrical solid portion of the Device 3, a perspective of which is shown in FIG. 16, and an aspiration or vacuum means to aid with sample withdrawal and dispensing. Various aspiration or vacuum means can be employed, including commercially available devices such as pipette controllers. An example of such a pipette control is the Drummond Pipet-Aid XL.

This device 3 can be manufactured in different manners. For example, the device can be manufactured by boring holes or channel in a solid cylindrical article. In other embodiments, the device can be molded, such as by injection molding. In yet other embodiments, the device can be manufactured by three-dimensional (3-D) printing methods. In each of these instances, a continuous bore, hole, or channel through the length of the cylindrical solid is produced or manufactured.

Device 3 can be constructed from a glass or plastic material to be essentially transparent to allow for ready visualization of the sample uptake. The device can be constructed by molding the object as a single piece, or can be made by drilling or boring a solid cylindrical blank piece of appropriate dimensions. The device can also be made by three-dimensional (3-D) printing techniques.

Methods for Using the Devices of the Present Invention

FIG. 1 is a drawing depicting the location of the buffy coat layer 102 (the layer containing the white blood cells, i.e. the leukocytes and platelets) of an anticoagulated blood sample following centrifugation of the blood sample in a centrifuge tube. Also indicated are the layer containing the red blood cells 101 (the erythrocytes), and the plasma layer 103 (the clear fluid layer).

The buffy coat layer is conveniently removed using the devices of the present invention (Device 1 and Device 2). The devices can be used either alone, or sequentially in either order. For optimal and quantitative buffy coat removal the methods use Device 1, followed by Device 2.

Figure 19:
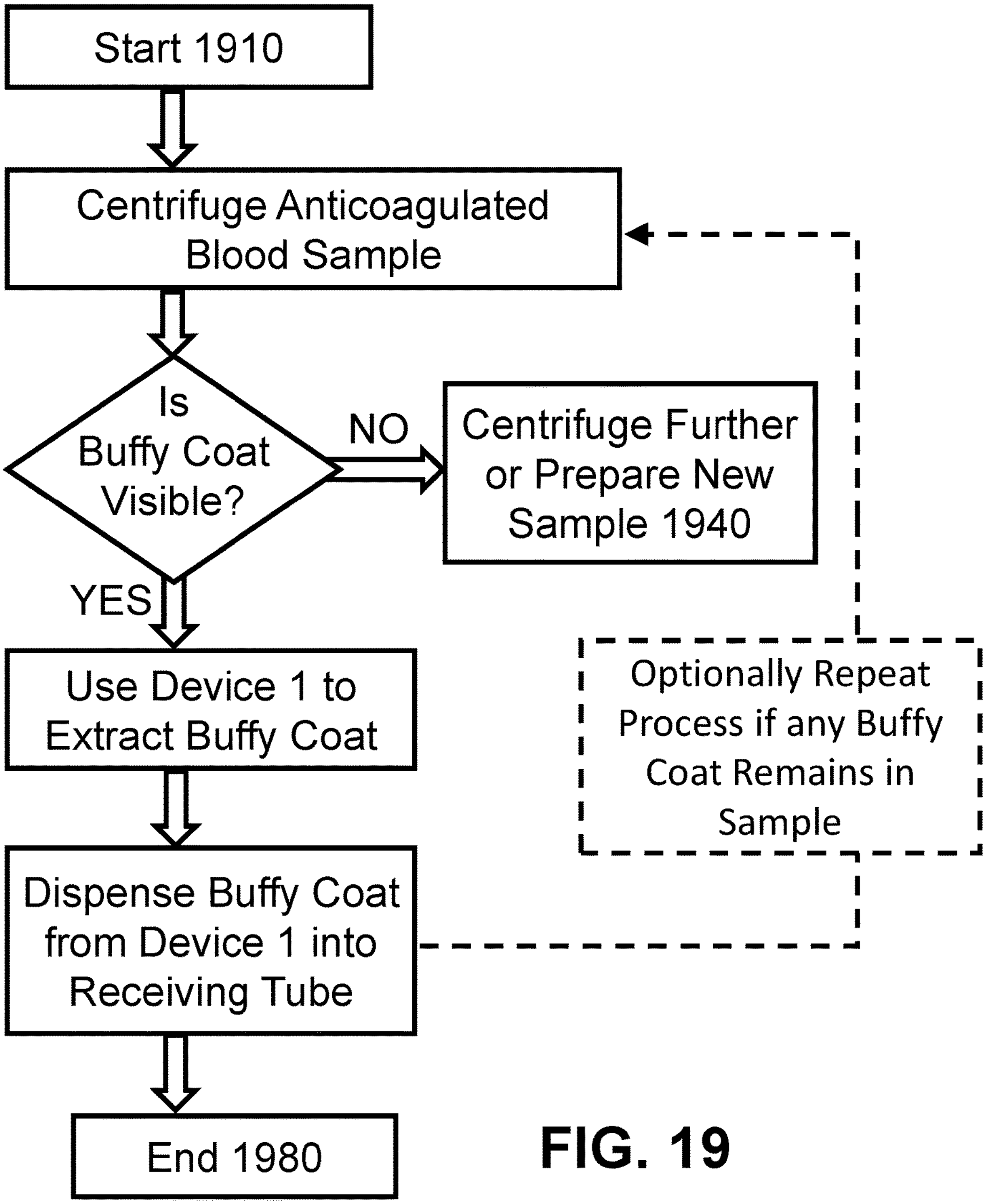
FIG. 19 is a flow diagram of an exemplary embodiment of carrying out the methods of the present invention using Device 1.

FIG. 19 shows a flow diagram of an exemplary method for retrieving a target liquid sample using Device 1. The device and its method of use generally employs an aspiration device. In this method Device 1 is used to retrieve the sample, such as a buffy coat layer from a centrifuged anti-coagulated blood sample. After retrieval, the sample is dispensed into an appropriate receptacle tube. The device can optionally be used two or more times if buffy coat remains in the sample after the first use.

Figure 20:
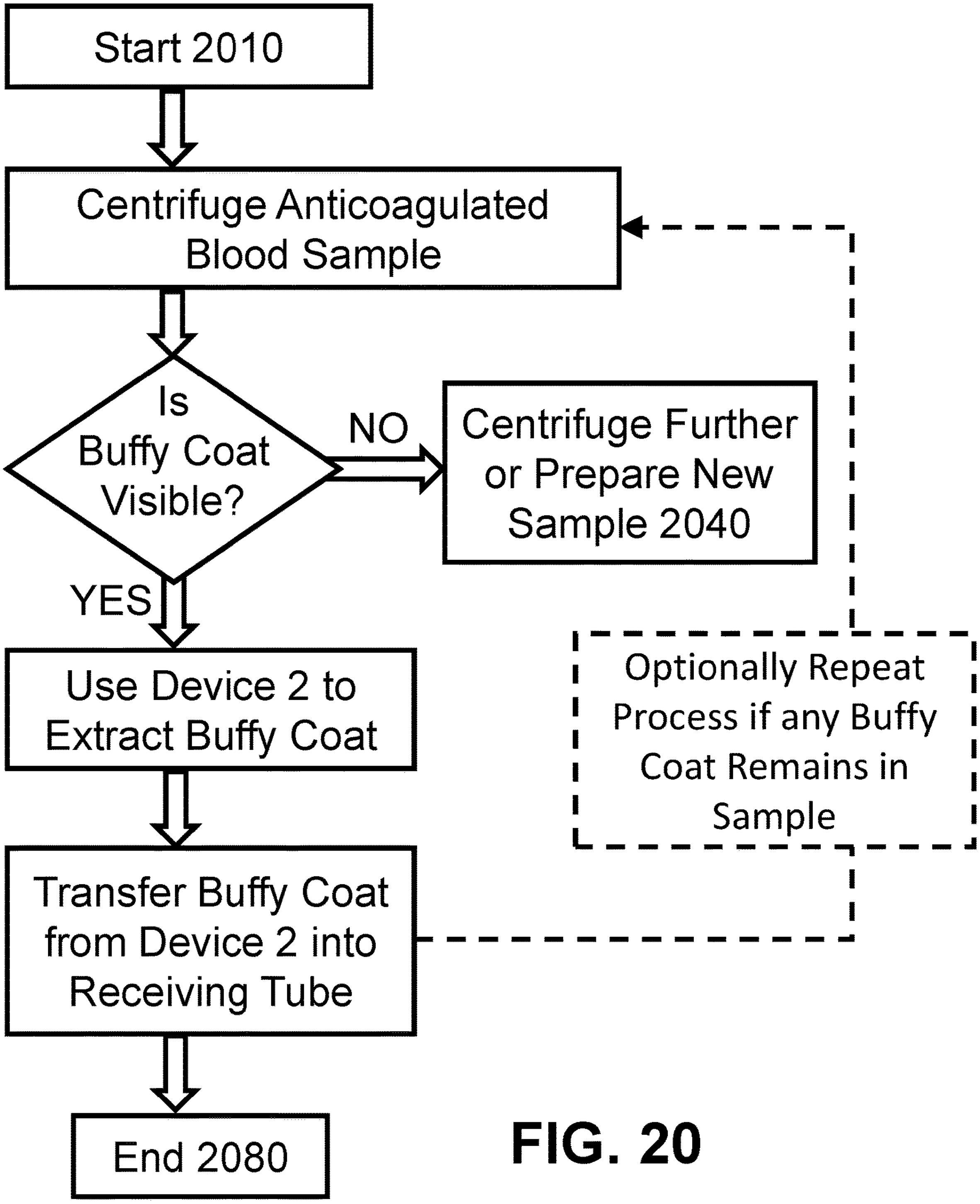
FIG. 20 is a flow diagram of an exemplary embodiment of carrying out the methods of the present invention using Device 2.

FIG. 20 shows a flow diagram of an exemplary method for retrieving a target liquid sample using Device 2. The array of flocked swabs is used without suction or aspiration, because of the high capillary action capacity of the tips of the flocked swabs. More effective removal of the buffy coat sample is achieved by using a twisting motion of the array of the flocked swabs in relation to the sample tube. If the optional protective sheath is present, then the flocked swabs are extended beyond the sheath, which can be inserted into the sample tube, for collection of the sample. After collection of the sample, the flocked swabs are retracted back into the protective sheath. After retrieval, the sample is dispensed or transferred into an appropriate receptacle tube. Note that the optional sheathe protects the material that is absorbed on the flocked swabs from smearing against the inner surface of the collection tube as the device is removed. The device can optionally be used two or more times if buffy coat remains in the sample after the first use.

Figure 21:
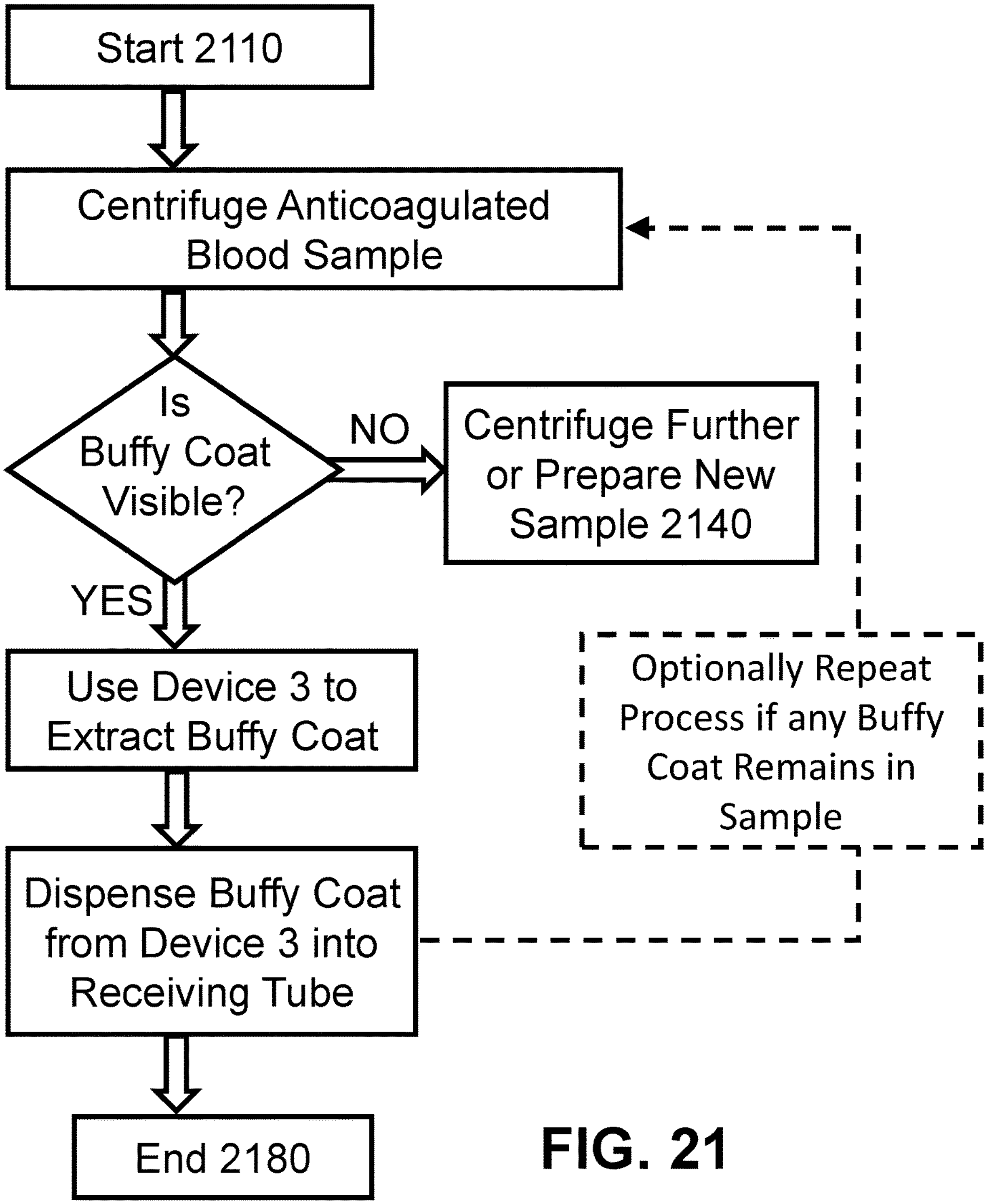
FIG. 21 is a flow diagram of an exemplary embodiment of carrying out the methods of the present invention using Device 3.

FIG. 21 shows a flow diagram of an exemplary method for retrieving a target liquid sample using Device 3. The device and its method of use generally employs an aspiration device. In this method Device 3 is used to retrieve the sample, such as a buffy coat layer from a centrifuged anti-coagulated blood sample. After retrieval, the sample is dispensed into an appropriate receptacle tube. The device can optionally be used two or more times if buffy coat remains in the sample after the first use.

Figure 22:
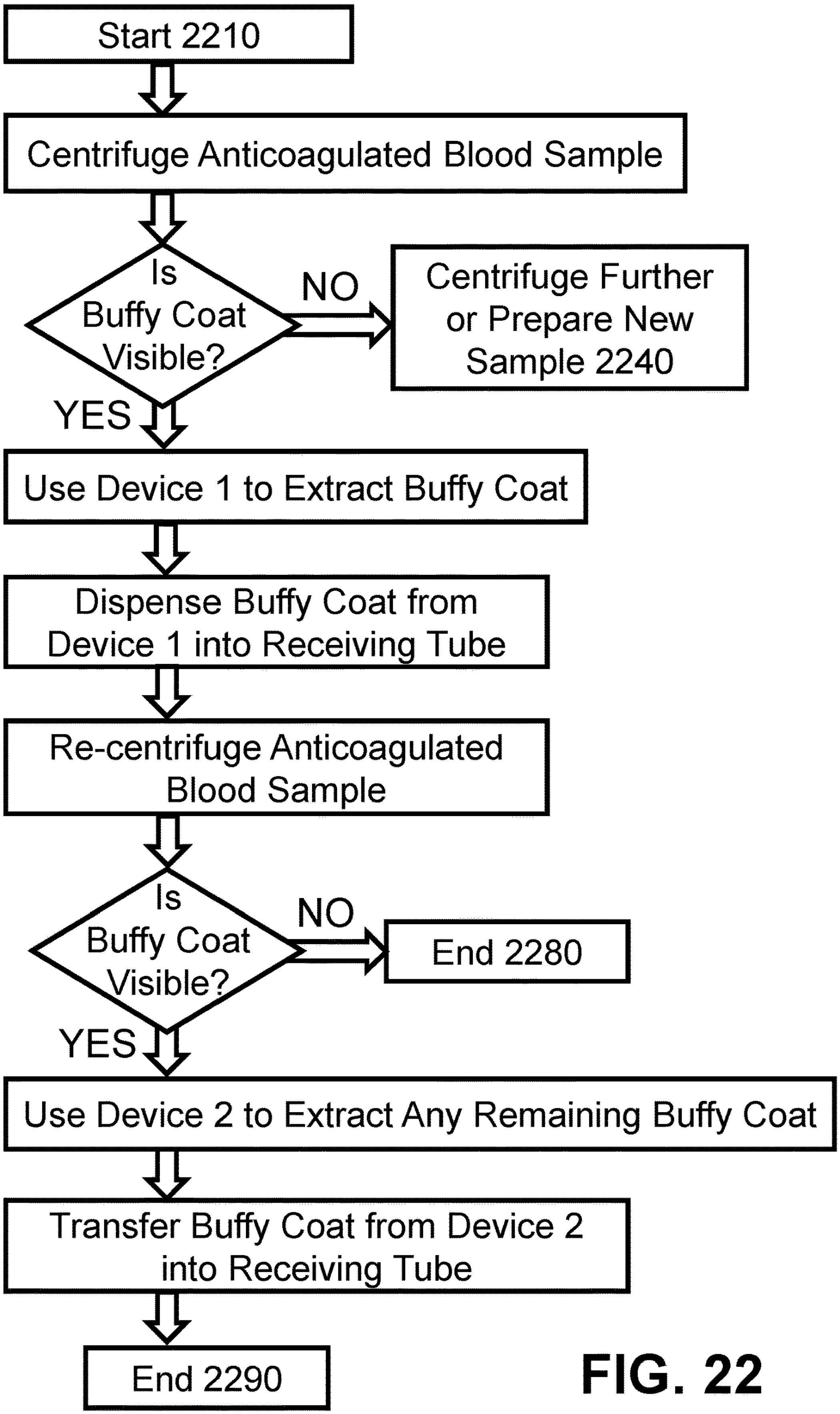
FIG. 22 is a flow diagram of an exemplary embodiment of carrying out the methods of the present invention using Device 1 followed by Device 2.

FIG. 22 shows a flow diagram of an example method for retrieving a target liquid sample by sequentially using Device 1 followed by using Device 2. The operation of each of the devices is essentially the same as described in the flow diagrams of FIGS. 19 and 20.

Figure 23:
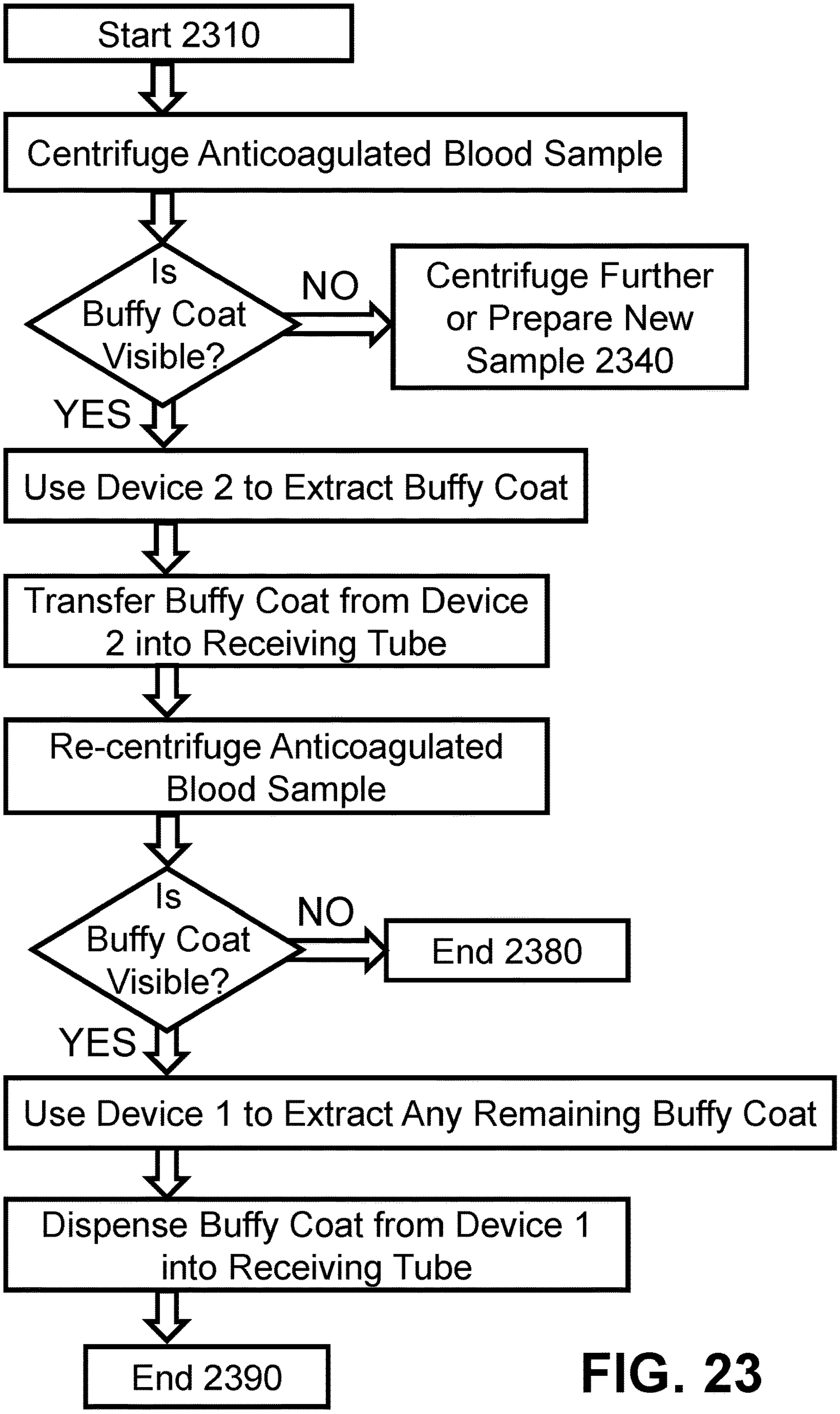
FIG. 23 is a flow diagram of an exemplary embodiment of carrying out the methods of the present invention using Device 2 followed by Device 1.

FIG. 23 shows a flow diagram of an example method for retrieving a target liquid sample by sequentially using Device 2 followed by using Device 1. The operation of each of the devices is essentially the same as described in the flow diagrams of FIGS. 19 and 20.

Figure 24:
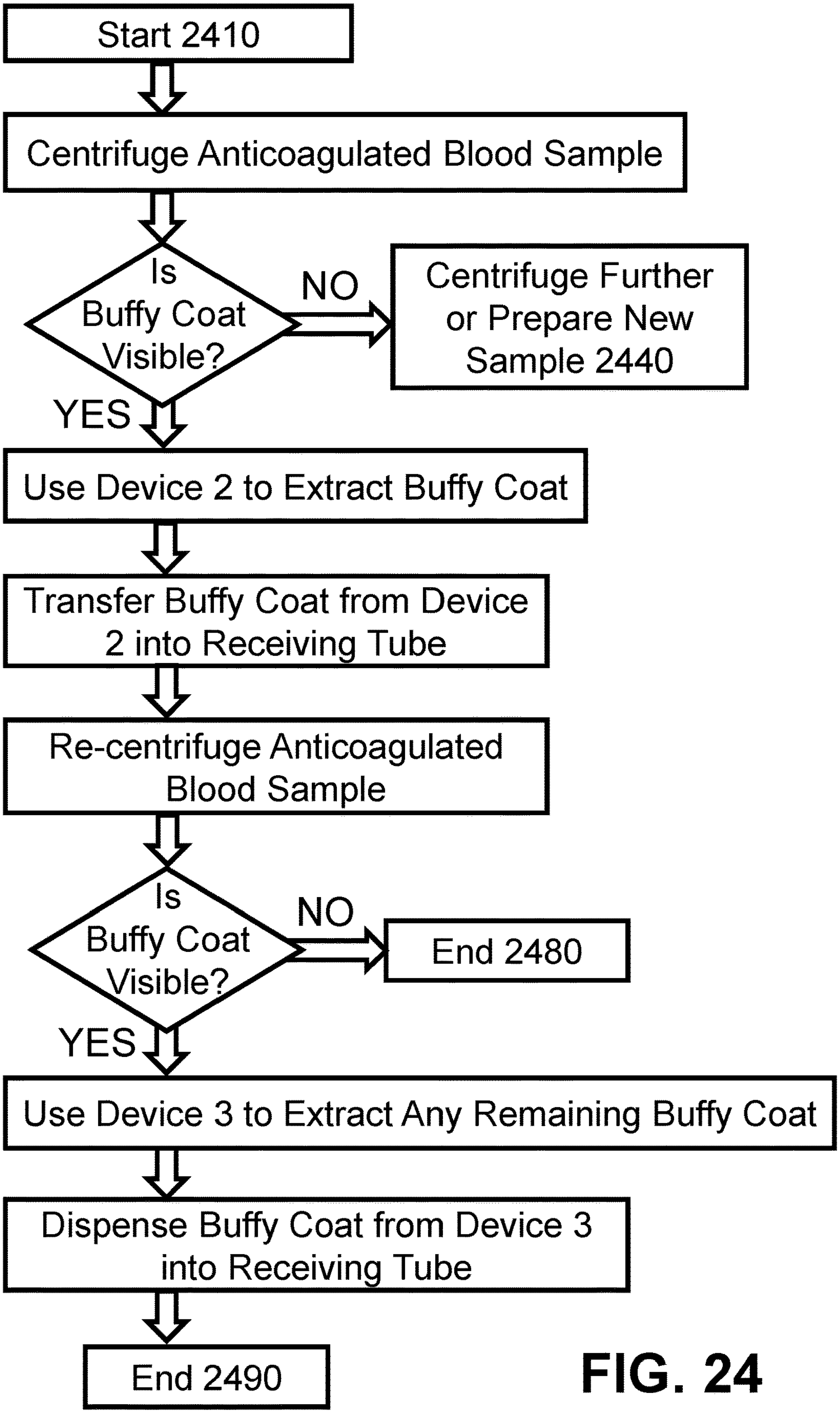
FIG. 24 is a flow diagram of an exemplary embodiment of carrying out the methods of the present invention using Device 2 followed by Device 3.

FIG. 24 shows a flow diagram of an example method for retrieving a target liquid sample by sequentially using Device 2 followed by using Device 3. The operation of each of the devices is essentially the same as described in the flow diagrams of FIGS. 20 and 21.

Figure 25:
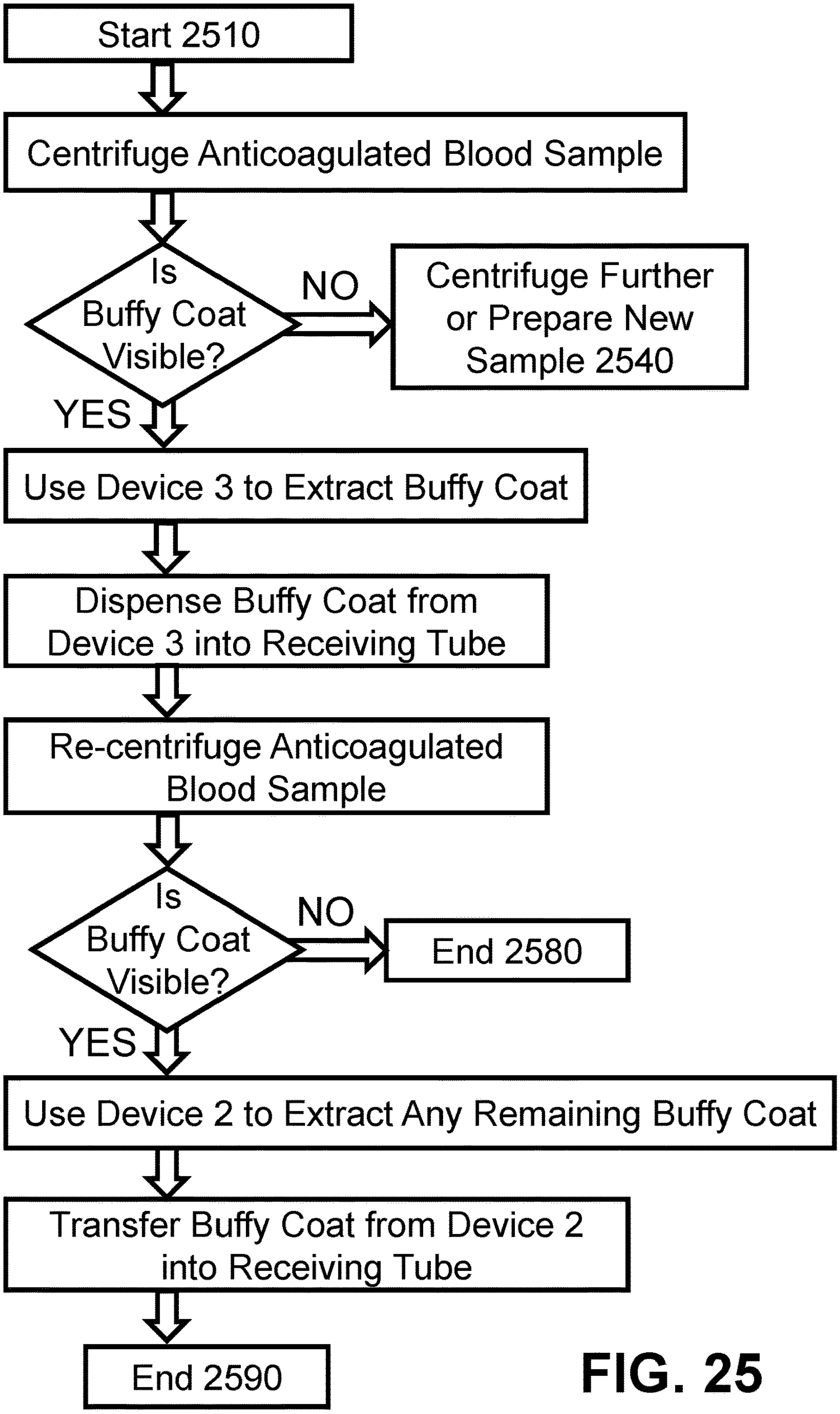
FIG. 25 is a flow diagram of an exemplary embodiment of carrying out the methods of the present invention using Device 3 followed by Device 2.

FIG. 25 shows a flow diagram of an example method for retrieving a target liquid sample by sequentially using Device 3 followed by using Device 2. The operation of each of the devices is essentially the same as described in the flow diagrams of FIGS. 20 and 21.

Figure 26:
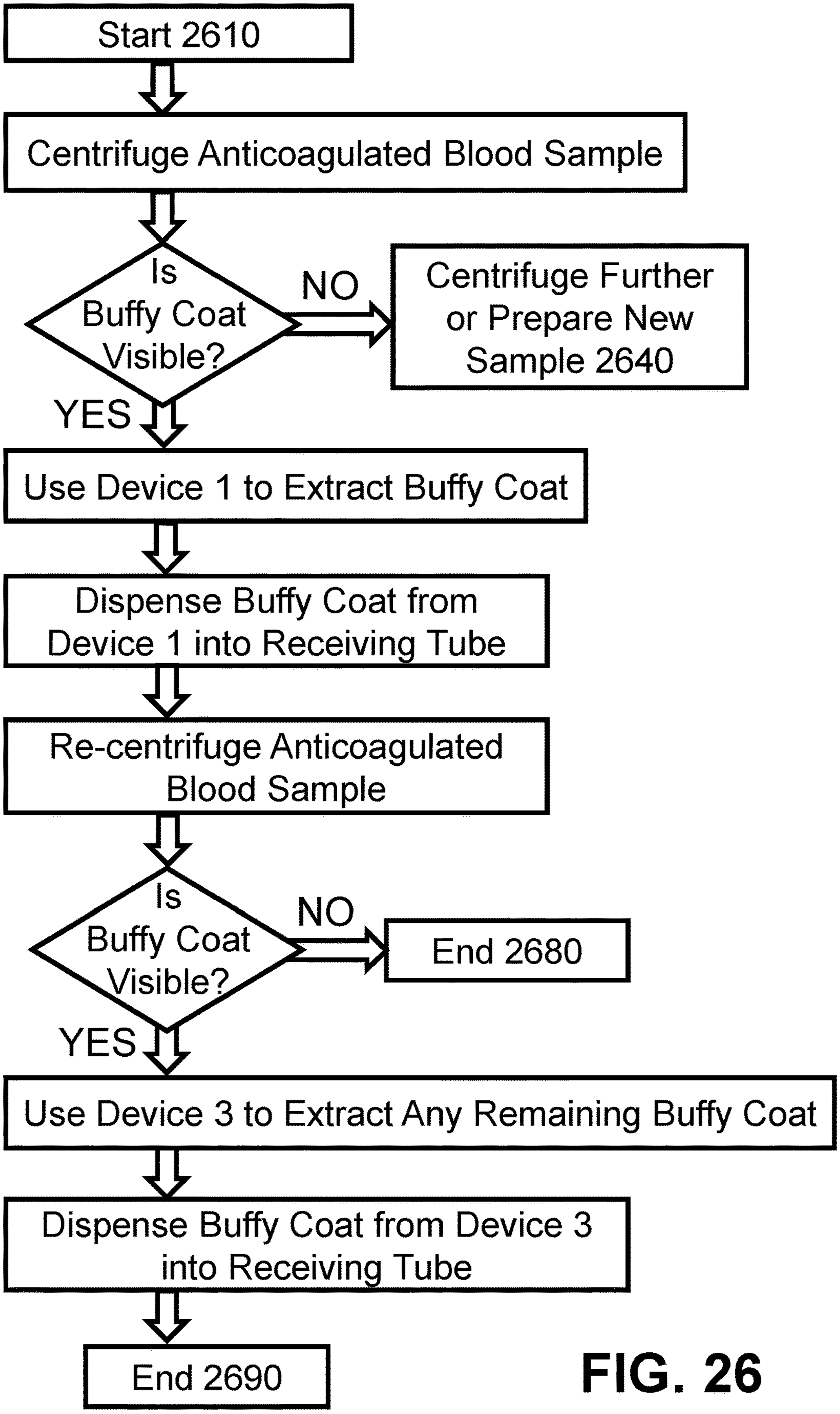
FIG. 26 is a flow diagram of an exemplary embodiment of carrying out the methods of the present invention using Device 1 followed by Device 3.

FIG. 26 shows a flow diagram of an example method for retrieving a target liquid sample by sequentially using Device 1 followed by using Device 3. The operation of each of the devices is essentially the same as described in the flow diagrams of FIGS. 19 and 21.

Figure 27:
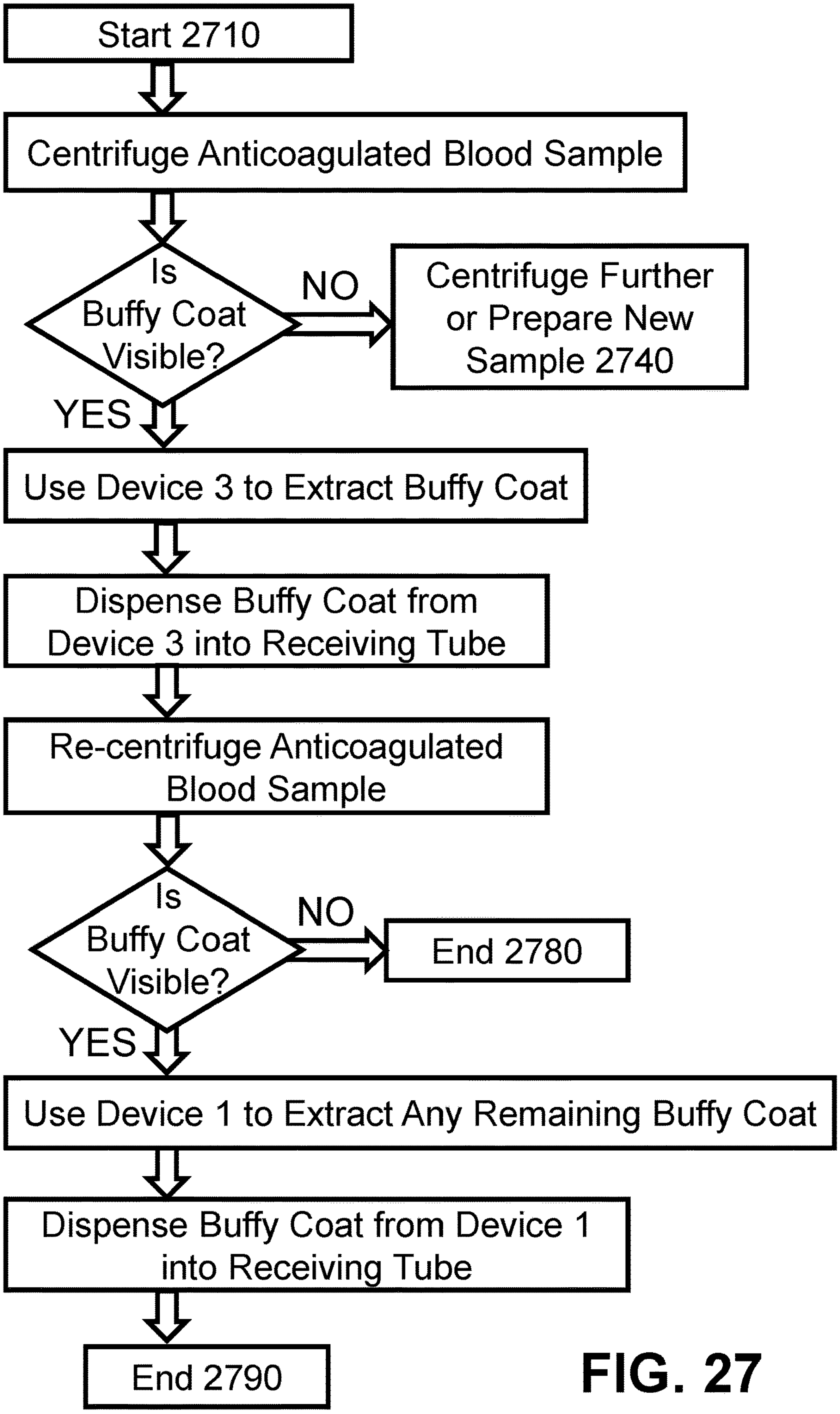
FIG. 27 is a flow diagram of an exemplary embodiment of carrying out the methods of the present invention using Device 3 followed by Device 1.

FIG. 27 shows a flow diagram of an example method for retrieving a target liquid sample by sequentially using Device 3 followed by using Device 1. The operation of each of the devices is essentially the same as described in the flow diagrams of FIGS. 19 and 21.

For using Devices 1 and 3, these can be attached to a variety of aspiration or vacuum means. These means include commercially available pipette controllers, a nonlimiting example of which is the Drummond Pipet-Aid XL. With the aid of such a pipette controller the buffy coat layer is easily extracted from the blood sample tube.

For using Device 2, no further aspiration or vacuum means is required for the performance of the flocked swabs for buffy coat removal. The flocked swabs of Device 2, can include a protective sheath. In use, the flocked-swabs can be extended beyond the protective sheath into the sample tube to withdraw the buffy coat. After withdrawal of the buffy coat, the flocked swabs are retracted back into the protective sheath and the device removed from the sample tube. During this use the protective sheath can make contact with the top of the sample tube to protect the flocked swabs as they are extended into and retracted from the sample, thereby keeping the device approximately centered in the sample tube as the flocked swabs are retracted from the sample in order avoid smearing the sample against the walls of the sample tube. The flocked swabs containing the withdrawn buffy coat can then be extended into a receiving container for the step of transferring the withdrawn buffy coat into the receiving container. In some embodiments, the receiving container contains a buffer to facilitate the transfer of the withdrawn buffy coat into the receiving container.

After using Device 1, Device 2, or Device 3, the collected buffy coat sample can be dispensed or transferred into a further collection tube for processing and analysis. In some embodiments, the dispensing or transferring of the collected buffy coat sample into a receiving container involves one or more centrifugation steps.

In embodiments where the same Device type is used more than one time sequentially to collect and dispense or transfer the fluid sample, the same device can be used for each use. Preferably, in each further use beyond the first use, an additional, new, or fresh device is used. As an illustrative example, Device 1 could first be used followed by that same Device 1 for the second use. Alternatively, as another illustrative example, Device 1 could first be used followed by a second Device 1, and so on. As an illustrative example, Device 2 could first be used followed by that same Device 2 for the second use. Alternatively, as another illustrative example, Device 2 could first be used followed by a second Device 2, and so on. As an illustrative example, Device 3 could first be used followed by that same Device 3 for the second use. Alternatively, as another illustrative example, Device 3 could first be used followed by a second Device 3, and so on. In embodiments where more than one Device type is used but one of the Device types is used more than one time, the same applies that the first device of the same type can be used for each use of that device type, or in each further use beyond the first use of that device type, an additional device can be used.

EXAMPLES

The following examples further described and demonstrate embodiments within the scope of the present invention. The Examples are given solely for purpose of illustration and are not to be construed as limitations of the present invention, as many variations thereof are possible without departing from the spirit and scope of the invention.

Example 1

A capillary tube device of the first type, Device 1, is prepared by collecting and arranging a total of 12 capillary tubes, each with both ends open and having an inner bore diameter of 2 mm, an outer diameter of 2.5 mm, and a length of 75 mm, in a circular array as per FIGS. 4 and 5. These tubes can be secured and held in place either with an adhesive wrapping or an adhesive applied to their surface, or any other securing or affixing means. The array of capillary tubes is inserted into a hand-held aspiration device such as shown in the exploded view of FIG. 6.

The resulting device is useful to remove the buffy coat layer from a centrifuged anticoagulated blood sample by touching the surface of the tubes to the sample and using the aspiration device to draw up the buffy coat. See FIG. 19. The blood sample can be prepared using either heparin or EDTA-coated centrifuge tubes to prevent coagulation. The blood sample can be centrifuged using ordinary means such as 1000×g for 10 minutes with no braking, to avoid disrupting the layers upon stopping.

Example 2

Figure 7:
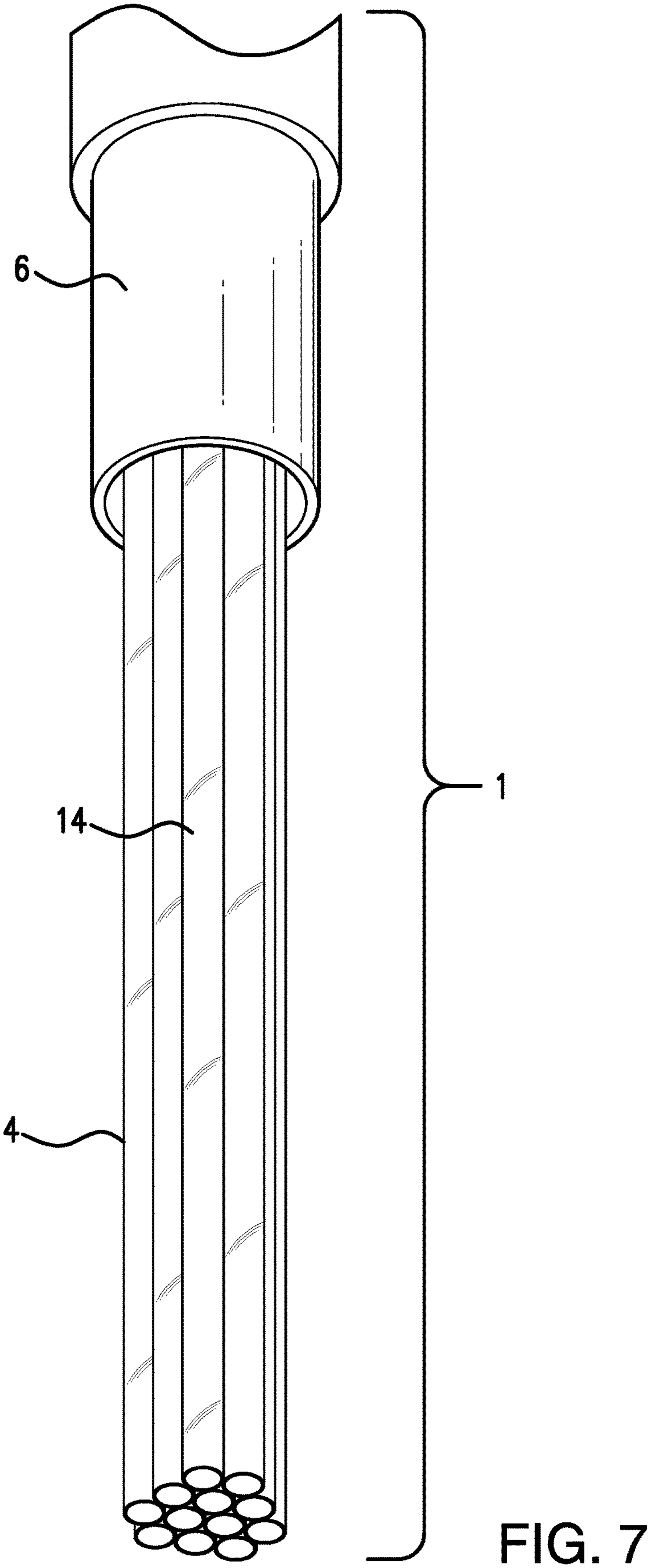
FIG. 7 is a perspective view of an embodiment of Device 1 (1) comprising the capillary tube array portion 4 coupled to an aspiration or vacuum means 6.

A flocked swab device of the second type, Device 2, is prepared by collecting and arranging a total of 3 flocked swabs (model no. 502CS01 Floq Swabs from Copan), in a circular array as per FIGS. 7 and 8. These swabs can be secured and held in place either with an adhesive wrapping or an adhesive applied to their surface or with any other appropriate securing or affixing means. The array of flocked swabs can be inserted into an optional protective plastic sleeve or sheath if desired.

The resulting device is useful to remove the buffy coat layer from a centrifuged anticoagulated blood sample by touching the surface of the tubes to the sample and using a twisting motion to swab up the side of the centrifuge tube as it is withdrawn. See FIG. 20. The array of swabs can be drawn back up into the protective plastic sleeve or sheath.

Example 3: Performance of Devices

The performance of the devices, i.e. Device 1 followed by Device 2, used sequentially, was evaluated using the recovery of circulating tumor cells (CTCs) from whole blood samples (See FIG. 22).

To assess recovery of the CTCs, 4 mls of EDTA-treated (ethylene diamine tetra-acetic acid-treated) whole blood is spiked with the myeloma cell line, H929, which was previously stained with Mitotracker Deep Red FM. This stain preferentially stains mitochondria in live cells, can withstand fixation, and allows the H929 cells to be visualized fluorescently by scanning device such as the RareCyte scanner. CTCs migrate with the buffy coat layer when subjected to centrifugation, which makes them an appropriate marker for recovery assessment using the devices of the present invention. The stained H929 cells are carefully counted using an automated cell counter prior to spiking to accurately dilute the sample to the desired spiked concentration. Control slides, for each spike concentration assessed, are prepared by spiking buffer (PBS, 2% BSA) with stained H929 cells at the same concentration as the spiked blood counterparts. For each spike concentration, control slides are prepared in triplicate. These controls are not subjected to the buffy coat isolation procedure and represent the standard to which the slides from the isolated spiked blood samples are compared when calculating recovery.

The following describes the buffy coat collection procedure, steps 1) to 7), and optional steps, steps 8) to 11) for further CTC quantitation.

1) Buffy coat spin: An anticoagulated (EDTA) whole blood sample is centrifuged at 1000×g for 10 minutes in a swinging bucket rotor, with the brake off, to form separate layers; the buffy coat being the thin layer immediately above the red blood cell (RBC) layer.
2) Buffy Coat Collection with Device 1: Plasma is removed from the top layer of the initial sample from centrifugation in (1) above. Device 1 is inserted into a Pipet-Aid® Pipette Controller (Drummond Scientific) and then inserted into the tube, through the buffy coat layer and just barely touching the top of the red blood cell layer. The sample is drawn up into Device 1) to the mark, by use of suction with the pipette.
3) Device 1 Spin: Device 1 is removed from the pipette and placed in a SepMate™-15 (Stemcell Technologies, Cat #85415) tube. The tube contains an insert, on which Device 1 sits atop, separating it from buffer below. The tube is centrifuged at 1000×g.
4) EDTA Sample Tube re-spin: To pack the remaining buffy coat more tightly for subsequent collection with Device 2, the initial blood sample (EDTA tube) from step (1) is centrifuged again at 1000×g. This step can be done simultaneously with step (3); in the same centrifuge.
5) Buffy Coat Collection with Device 2: Device 2 is inserted into the EDTA tube, with the sheath over swab heads. As Device 2 approaches the buffy coat, swabs are pushed through the sheath, until just touching the top of the RBC layer and swirled several times to swab the remaining buffy coat. Device 2 is then pulled back up into sheath, to prevent the collected sample from rubbing off on the inner tube surface.
6) (Device 2) Spin: Device 2 is placed in a second SepMate™-15 tube, containing buffer below the tube insert [see step 3) above]. The tube is centrifuged at 1000 g.
7) Resuspension of Sample Pellet/Combining of Samples: Pellets resulting from centrifugation from each sample SepMate™-15 tube are resuspended, using a Pasteur pipet, inserted through a hole in the SepMate™-15 tube insert. The suspensions are removed from each tube and combined into a new 15 ml conical tube. The tube is centrifuged at 1000×g to obtain pellet. The supernatant is pipetted off and discarded.

The buffy coat collection is complete at this point in the procedure. When analysis of a specific cell type (e.g., CTCs) is desired, one would proceed with steps 8) to 11) for antibody staining and slide preparation. Slides would then be dried, cover slipped and scanned on a cell analyzer instrument to enumerate cells of interest.

8) Optional Immunostaining: When subsequent quantification of a specific cell type is desired (e.g., CTCs) the pellet can be stained with antibodies specific for the cells of interest. Slides produced from the resulting buffy coat [see step 11)] can then be analyzed with a commercially available cell analyzer to enumerate cells of interest.
9) RBC Lysis and Fixation: RBC lysis/Fixation solution (Biolegend, Cat #422401) is added to the pellet (2 mL of RBC lysis/fixation solution to 200 µl of sample volume). After a 15 minute incubation, the sample is centrifuged at 500×g for 5 minutes.
10) Wash Step: The supernatant from step 9) is discarded and Cell Staining Buffer (Biolegend, Cat #420201) is added in the same ratio as RBC Lysis/Fixation solution [see step 8)]. The sample is centrifuged at 500×g for 5 minutes. The supernatant is removed and the resulting pellet consists of the buffy coat, with very little RBC contamination.
11) Optional Slide Preparation: The buffy coat can be brought up in 500-1000 µL of the desired buffer and then spread across glass microscope slides (100 µl/slide). These slides can be used for downstream applications, such as immunostaining.

The performance data for this experiment is provided as the percent recovery as indicated in Table 1.

TABLE 1

| Sample Type | Percent Recovery |
|---|---|
| Total Buffy Coat | 86%[1] |
| CTCs @ 200 cells/ml | 90%[1] |
| CTCs @ 50 cells/ml | 92%[2] |
| CTCs @ 10 cells/ml | 93%[2] |

[1]Recovery data obtained from 5 experiments, which included analysis of 11 samples total (multiple replicates of each sample). Initial (pre-isolation) and recovered (post-isolation) WBC numbers are counted using Countess II Automated Cell Counter. Initial CTC numbers are counted using Countess II Automated Cell Counter and recovered CTC numbers are counted using RareCyte CyteFinder.

[2]Recovery data obtained from 1 experiment, which included analysis of a single patient, run in triplicate. Initial CTC numbers are counted using Countess II Automated Cell Counter and recovered CTC numbers are counted using RareCyte CyteFinder.

Example 4: Performance of Tubular Device with Multiple Bores

The performance of the tubular device with 8 bores (Device 3) which was 3-D printed, used twice sequentially or just a single time, was evaluated using the recovery of circulating tumor cells (CTCs) from whole blood samples (See FIG. 21).

To assess recovery of the CTCs, 4 mLs of EDTA-treated (ethylene diamine tetra-acetic acid-treated) whole blood is spiked with the myeloma cell line, H929, which was previously stained with Mitotracker Deep Red FM. This stain preferentially stains mitochondria in live cells, can withstand fixation, and allows the H929 cells to be visualized fluorescently by scanning device such as the RareCyte scanner. CTCs migrate with the buffy coat layer when subjected to centrifugation, which makes them an appropriate marker for recovery assessment using the devices of the present invention. The stained H929 cells are carefully counted using an automated cell counter prior to spiking to accurately dilute the sample to the desired spiked concentration. Control slides, for each spike concentration assessed, are prepared by spiking buffer (PBS, 2% BSA) with stained H929 cells at the same concentration as the spiked blood counterparts. For each spike concentration, control slides are prepared in triplicate. These controls are not subjected to the buffy coat isolation procedure and represent the standard to which the slides from the isolated spiked blood samples are compared when calculating recovery.

The following describes the buffy coat collection procedure, steps 1) to 7), and optional steps, steps 8) to 11) for further CTC quantitation.

1) Buffy coat spin: An anticoagulated (EDTA) whole blood sample is centrifuged at 1000×g for 10 minutes in a swinging bucket rotor, with the brake off, to form separate layers; the buffy coat being the thin layer immediately above the red blood cell (RBC) layer.
2) Buffy Coat Collection with 3D, 8 bore device: Plasma is removed from the top layer of the initial sample from centrifugation in (1) above. Device 3 is inserted into a Pipet-Aid® Pipette Controller (Drummond Scientific) and then inserted into the tube, through the buffy coat layer and just barely touching the top of the red blood cell layer. The sample is drawn up into the Device to the mark, by use of suction with the pipette. Note that in recovery experiments where the 3D printed, 8 hole device is used only a single time, the sample is drawn up to an undetermined volume. The suction aspiration is stopped when the buffy coat layer, by visual inspection only, appears to be completely removed)
3) 3D printed, 8 bore device (Device 3) Centrifugation: Device 3 is removed from the pipette and placed in a SepMate™-15 (Stemcell Technologies, Cat #85415) tube. The tube contains an insert, on which Device 3 sits atop, separating it from buffer below. The tube is centrifuged at 1000×g. In recovery experiments, where the 3D printed, 8 bore devices are used a single time, steps 4, 5 and 6 are eliminated and the process would proceed to Step 7.
4) EDTA Sample Tube re-spin: To pack the remaining buffy coat more tightly for another subsequent collection with 3D printed, 8 bore device (Device 3), the initial blood sample (EDTA tube) from step (1) is centrifuged again at 1000×g. This step can be done simultaneously with step (3); in the same centrifuge.
5) Buffy Coat Collection with another 3D printed, 8 bore Device (Device 3): A second device 3 is inserted into a Pipet-Aid® Pipette Controller (Drummond Scientific) and then inserted into the tube, through the buffy coat layer and just barely touching the top of the red blood cell layer. The sample is drawn up into Device 3 to the mark, by use of suction with the pipette.
6) (3D printed, 8 bore device) Centrifugation: The second 3D printed, 8 hole Device 3 is placed in a second SepMate™-15 tube, containing buffer below the tube insert [see step 3) above]. The tube is centrifuged at 1000×g.
7) Resuspension of Sample Pellet/Combining of Samples: Pellets resulting from centrifugation from each sample SepMate™-15 tube are resuspended, using a Pasteur pipet, inserted through a hole in the SepMate™-15 tube insert. The suspensions are removed from each tube and combined into a new 15 ml conical tube. The tube is centrifuged at 1000×g to obtain pellet. The supernatant is pipetted off and discarded.

The buffy coat collection is complete at this point in the procedure. When analysis of a specific cell type (e.g., CTCs) is desired, one would proceed with steps 8) to 11) for antibody staining and slide preparation. Slides would then be dried, cover slipped and scanned on a cell analyzer instrument to enumerate cells of interest.

8) Optional Immunostaining: When subsequent quantification of a specific cell type is desired (e.g., CTCs) the pellet can be stained with antibodies specific for the cells of interest. Slides produced from the resulting buffy coat [see step 11)] can then be analyzed with a commercially available cell analyzer to enumerate cells of interest.
9) RBC Lysis and Fixation: RBC lysis/Fixation solution (Biolegend, Cat #422401) is added to the pellet (2 mL of RBC lysis/fixation solution to 200 μl of sample volume). After a 15 minute incubation, the sample is centrifuged at 500×g for 5 minutes.
10) Wash Step: The supernatant from step 9) is discarded and Cell Staining Buffer (Biolegend, Cat #420201) is added in the same ratio as RBC Lysis/Fixation solution [see step 8)]. The sample is centrifuged at 500×g for 5 minutes. The supernatant is removed and the resulting pellet consists of the buffy coat, with very little RBC contamination.
11) Optional Slide Preparation: The buffy coat can be brought up in 500-1000 μL of the desired buffer and then spread across glass microscope slides (100 μl/slide). These slides can be used for downstream applications, such as immunostaining.

The performance data for recovery experiments using the 3D printed 8 bore device twice or a single time is provided as the percent recovery as indicated in Table 2.

TABLE 2

| Sample Type | Percent Recovery |
|---|---|
| CTCs @ 300 cells/ml (device used twice sequentially) | 94%[1] |
| CTCs @ 300 cells/ml (device used once) | 98%[1] |
| CTCs @ 30 cells/ml (device used twice sequentially) | 97%[1] |
| CTCs @ 12 cells/ml (device used once) | 89%[1] |

[1]Recovery data obtained from one experiment, which included analysis of a single patient, run in duplicate. Percent recovery is presented as an average of the replicates. Initial CTC numbers are counted using Countess II Automated Cell Counter and recovered CTC numbers are counted using RareCyte CyteFinder.

It is to be understood that the above description is intended to be illustrative, and not restrictive. For example, the above-discussed embodiments can be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the methods and systems of the present invention, where the term comprises is used with respect to the recited steps of the methods or components of the compositions, it is also contemplated that the methods and compositions consist essentially of, or consist of, the recited steps or components. Furthermore, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances a composition can be described as being composed of the components prior to mixing, or prior to a further processing step such as drying, binder removal, heating, sintering, etc. It is recognized that certain components can further react or be transformed into new materials.

All percentages and ratios used herein are on a volume (volume/volume) or weight (weight/weight) basis as shown, or otherwise indicated.

What is claimed is:

1. A fluid sample collection device, comprising:

a cylindrical solid comprising first and second ends opposed on a length axis of the cylindrical solid, and a plurality of bores substantially parallel to the length axis of the cylindrical solid and continuous from the first end through the second end, wherein the first end is configured to directly couple to a means for applying a vacuum, wherein each bore of the plurality of bores defines a circular cross-section, and wherein the plurality of bores are arranged in an array which has a hexagonal, a partial hexagonal, an approximately hexagonal, a heptagonal, or a trigonal packing pattern.

2. The device according to claim 1 wherein the array comprises from about 3 to about 25 bores.

3. The device according to claim 1 wherein the array comprises 7 bores defining a symmetrical hexagonal array with a central bore surrounded by 6 bores symmetrically disposed around the central bore.

4. The device according to claim 1 wherein the array comprises 8 bores defining a symmetrical heptagonal array with a central bore surrounded by 7 bores symmetrically disposed around the central bore.

5. The device according to claim 1 wherein the cylindrical solid has an outer diameter of about 5 mm to about 20 mm.

6. The device according to claim 1 wherein each bore has an inner diameter from about 0.5 mm to about 5 mm.

7. The device according to claim 1 wherein each bore has an inner diameter of about 2 mm.

8. The device according to claim 1 wherein the cylindrical solid has a length from about 40 mm to about 150 mm.

9. The device according to claim 1 wherein the means for applying aspiration or a vacuum is an automatic pipetting device.

10. The device according to claim 1 wherein said fluid is a biological fluid.

11. The device according to claim 1, wherein each bore is capable of drawing a liquid sample by capillary action.

12. The device of claim 1 wherein the cylindrical solid is transparent or translucent.

13. The device of claim 1 wherein the cylindrical solid is transparent.

14. The device of claim 1 constructed from a material selected from the group consisting of glass and polymeric materials or filaments, the polymeric materials or filaments selected from the group consisting of polylactic acid (PLA), acrylonitrile butadiene styrene (ABS), polycarbonate (PC), polyethylene terephthalate glycol (PETG); and poly(methyl methacrylate) (PMMA).

15. The device of claim 1 further comprising markings or etchings to indicate a volume of a liquid sample contained within the device.

16. A system for collecting the buffy coat from a blood sample, comprising:

(i) a blood collection tube having an inner diameter;

(ii) a cylindrical solid according to claim 1; and (iii) a means for applying a vacuum to the first end of the cylindrical solid.

17. The system of claim 16, wherein the outer diameter of the cylindrical solid is from about 5 mm to about 20 mm.

18. The system of claim 16, wherein the interior of the blood collection tube is coated with an anticoagulant.

19. The system of claim 16, wherein the cylindrical solid comprises from about 3 to about 25 bores.

20. A fluid sample collection device, comprising:

a cylindrical solid comprising first and second ends opposed on a length axis of the cylindrical solid, and a plurality of bores substantially parallel to the length axis of the cylindrical solid and continuous from the first end through the second end, wherein the first end is configured to directly couple to a means for applying a vacuum, wherein the cylindrical solid comprises markings or etchings to indicate a volume of a liquid sample contained within the device.

21. The fluid sample collection device of claim 20, wherein each bore has an inner diameter from about 0.5 mm to about 5 mm.

22. The fluid sample collection device of claim 20, wherein the cylindrical solid is transparent or translucent.

* * * * *